United States Patent
Zhang et al.

(10) Patent No.: US 12,118,470 B2
(45) Date of Patent: Oct. 15, 2024

(54) SYSTEM FOR PREDICTING AGGRESSIVE DRIVING

(71) Applicants: DENSO International America, Inc., Southfield, MI (US); THE REGENTS OF THE UNIVERSITY OF MICHIGAN, Ann Arbor, MI (US)

(72) Inventors: Ethan Zhang, Ann Arbor, MI (US); Neda Masoud, Ann Arbor, MI (US); Wei Zhang, Novi, MI (US); Rajesh Kumar Malhan, Troy, MI (US)

(73) Assignees: DENSO International America, Inc., Southfield, MI (US); The Regents of The University of Michigan, Ann Arbor, MI (US)

( * ) Notice: Subject to any disclaimer, the term of this patent is extended or adjusted under 35 U.S.C. 154(b) by 998 days.

(21) Appl. No.: 17/006,470

(22) Filed: Aug. 28, 2020

(65) Prior Publication Data
US 2021/0125076 A1 Apr. 29, 2021

Related U.S. Application Data

(60) Provisional application No. 62/927,306, filed on Oct. 29, 2019.

(51) Int. Cl.
*G06N 3/088* (2023.01)
*G08G 1/052* (2006.01)
*G08G 1/056* (2006.01)

(52) U.S. Cl.
CPC ............ *G06N 3/088* (2013.01); *G08G 1/052* (2013.01); *G08G 1/056* (2013.01)

(58) Field of Classification Search
CPC ......... G06N 3/088; G08G 1/052; G08G 1/056
See application file for complete search history.

(56) References Cited

U.S. PATENT DOCUMENTS

| | | | |
|---|---|---|---|
| 2014/0236414 A1 | 8/2014 | Droz et al. | |
| 2017/0166124 A1* | 6/2017 | Nakagawa | G08G 1/163 |
| 2019/0244521 A1* | 8/2019 | Ran | G08G 1/096775 |
| 2019/0263417 A1* | 8/2019 | Rau | B60W 40/12 |
| 2020/0065711 A1* | 2/2020 | Clément | B60W 30/0956 |

(Continued)

OTHER PUBLICATIONS

Kieu, et al. ("Outlier detection for multidimensional time series using deep neural networks." 2018 19th IEEE international conference on mobile data management (MDM). IEEE, 2018 (Year: 2018).*

(Continued)

*Primary Examiner* — Li B. Zhen
*Assistant Examiner* — Moriam Mosunmola Godo

(57) ABSTRACT

A system for predicting aggressive driving behavior for a driver of a vehicle includes a first edge computing device that can acquire spatial-temporal data for the vehicle from one or more sensors that are part of traffic infrastructure. The first edge computing device includes a processor and instructions executable by the processor that execute deep learning methods on the data from the sensors to cluster the data as a driving score. A trained model is applied to the driving score to determine an aggressive driving behavior risk level, and the first edge computing device is configured to predict the aggressive driving behavior based on the aggressive driving behavior risk level.

19 Claims, 8 Drawing Sheets

(56) References Cited

U.S. PATENT DOCUMENTS

| | | | |
|---|---|---|---|
| 2020/0089246 A1* | 3/2020 | McGill, Jr. | G05D 1/0214 |
| 2020/0114924 A1* | 4/2020 | Chen | B60W 40/09 |
| 2020/0379461 A1* | 12/2020 | Singh | G06N 3/044 |
| 2021/0058814 A1* | 2/2021 | Puranic | H04W 28/0268 |
| 2022/0105926 A1* | 4/2022 | Zhang | G08G 1/163 |

OTHER PUBLICATIONS

Ding et al. ("A New Multi-vehicle Trajectory Generator to Simulate Vehicle-to-Vehicle Encounters.", arXiv: 1809.05680v5 [cs.CV] Feb. 24, 2019) (Year: 2019).*

He et al. ("Stann: a spatio-temporal attentive neural network for traffic prediction." IEEE Access 7 (2018): 4795-4806.) (Year: 2018).*

Zhu et al. "Deep and confident prediction for time series at uber." 2017 IEEE International Conference on Data Mining Workshops (ICDMW). IEEE, 2017 (Year: 2017).*

Intersection Safety—Background and Objectives, U.S. Department of Transportation, 2018.

Lajunen, T. and D. Parker, Are aggressive people aggressive drivers? A study of the relationship between self-reported general aggressiveness, driver anger and aggressive driving. Accident Analysis & Prevention, vol. 33, No. 2, 2001, pp. 243-255.

Houston, J. M., P. B. Harris, and M. Norman, The Aggressive Driving Behavior Scale: Developing a self-report measure of unsafe driving practices. North American Journal of Psychology, vol. 5, No. 2, 2003, pp. 269-278.

Mizell, L., M. Joint, D. Connell, et al., Aggressive driving: Three studies, 1997.

Constantinou, E., G. Panayiotou, N. Konstantinou, A. Loutsiou-Ladd, and A. Kapardis, Risky and aggressive driving in young adults: Personality matters. Accident Analysis & Prevention, vol. 43, No. 4, 2011, pp. 1323-1331.

Aljaafreh, A., N. Alshabatat, and M. S. N. Al-Din, Driving style recognition using fuzzy logic. In 2012 IEEE International Conference on Vehicular Electronics and Safety (ICVES 2012), IEEE, 2012, pp. 460-463.

Shinar, D. and R. Compton, Aggressive driving: an observational study of driver, vehicle, and situational variables. Accident Analysis & Prevention, vol. 36, No. 3, 2004, pp. 429-437.

Deffenbacher, J. L., E. R. Oetting, and R. S. Lynch, Development of a driving anger scale. Psychological reports, vol. 74, No. 1, 1994, pp. 83-91.

Depasquale, J. P., E. S. Geller, S.W. Clarke, and L. C. Littleton, Measuring road rage: Development of the propensity for angry driving scale. Journal of Safety Research, vol. 32, No. 1, 2001, pp. 1-16.

Krahé, B. and I. Fenske, Predicting aggressive driving behavior: The role of macho personality, age, and power of car. Aggressive Behavior: Official Journal of the International Society for Research on Aggression, vol. 28, No. 1, 2002, pp. 21-29.

Dula, C. S. and E. S. Geller, Risky, aggressive, or emotional driving: Addressing the need for consistent communication in research. Journal of safety research, vol. 34, No. 5, 2003, pp. 559-566.

Johnson, D. A. and M. M. Trivedi, Driving style recognition using a smartphone as a sensor platform. In 2011 14th International IEEE Conference on Intelligent Transportation Systems (ITSC), IEEE, 2011, pp. 1609-1615.

Eren, H., S. Makinist, E. Akin, and A. Yilmaz, Estimating driving behavior by a smartphone. In 2012 IEEE Intelligent Vehicles Symposium, IEEE, 2012, pp. 234-239.

Karaduman, O., H. Eren, H. Kurum, and M. Celenk, An effective variable selection algorithm for Aggressive/Calm Driving detection via CAN bus. In 2013 International Conference on Connected Vehicles and Expo (ICCVE), IEEE, 2013, pp. 586-591.

Woodhouse, K., U-M is turning Ann Arbor into the world's largest lab for wireless vehicle communication, 2014.

Cronin, B., Vehicle Based Data and Availability, 2012.

Dula, C. S. and M. E. Ballard, Development and evaluation of a measure of dangerous, aggressive, negative emotional, and risky driving 1. Journal of Applied Social Psychology, vol. 33, No. 2, 2003, pp. 263-282.

Liao, T. W., Clustering of time series data—a survey. Pattern recognition, vol. 38, No. 11, 2005, pp. 1857-1874.

Ketchen, D. J. and C. L. Shook, The application of cluster analysis in strategic management research: an analysis and critique. Strategic management journal, vol. 17, No. 6, 1996, pp. 441-458.

Berndt, D. J. and J. Clifford, Using dynamic time warping to find patterns in time series. In KDD workshop, Seattle, WA, 1994, vol. 10, pp. 359-370.

Petitjean, F. and P. Gançarski, Summarizing a set of time series by averaging: From Steiner sequence to compact multiple alignment. Theoretical Computer Science, vol. 414, No. 1, 2012, pp. 76-91.

Taylor, J., X. Zhou, N. M. Rouphail, and R. J. Porter, Method for investigating intradriver heterogeneity using vehicle trajectory data: a Dynamic TimeWarping approach. Dec. 26, 2014, pp. 1-39.

Liu, F. T., K. M. Ting, and Z.-H. Zhou, Isolation-based anomaly detection. ACM Transactions on Knowledge Discovery from Data (TKDD), vol. 6, No. 1, 2012, p. 3.

Rousseeuw, P. J. and K. V. Driessen, A fast algorithm for the minimum covariance determinant estimator. Dec. 15, 1998, pp. 1-30.

Perdisci, R., G. Gu, W. Lee, et al., Using an Ensemble of One-Class SVM Classifiers to Harden Payload-based Anomaly Detection Systems. in ICDM, Citeseer, 2006, vol. 6, pp. 488-498.

Bender F A, Kaszynski M, Sawodny O. Drive cycle prediction and energy management optimization for hybrid hydraulic vehicles [J]. IEEE Transactions on vehicular technology, 2013, 62(8): 3581-3592.

Sun C, Hu X, Moura S J, et al. Velocity predictors for predictive energy management in hybrid electric vehicles [J]. IEEE Transactions on Control Systems Technology, 2015, 23(3): 1197-1204.

Zhao G, Wu C, Qiao C. A Mathematical Model for the Prediction of Speeding with its Validation [J]. IEEE Transactions on Intelligent Transportation Systems, 2013, 14(2): 828-836.

Jiang B, Fei Y. Vehicle speed prediction by two-level data driven models in vehicular networks [J]. IEEE Transactions on Intelligent Transportation Systems, 2017, 18(7): 1793-1801.

* cited by examiner

SYSTEM FOR PREDICTING AGGRESSIVE DRIVING

CROSS-REFERENCE TO RELATED APPLICATIONS

This application claims the benefit of U.S. Provisional Application No. 62/927,306 filed Oct. 29, 2019. The entire disclosure of the application referenced above is incorporated by reference.

FIELD

The present disclosure relates to a system for predicting aggressive driving behavior of road vehicles such as cars and trucks.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Intersections may be a common location of aggressive driving behavior. Because aggressive driving behavior may occur at intersections, conventional systems and methods have been developed to identify aggressive driving behavior. However, such conventional systems and methods may be limited in function. Accordingly, conventional systems and methods for identifying aggressive driving behavior are subject to improvement.

SUMMARY

In one example, a system for predicting aggressive driving behavior for a driver is provided that may include a first edge computing device configured to acquire spatial-temporal data for the vehicle from one or more sensors that are part of traffic infrastructure. The first edge computing device may have a processor and a non-transitory computer-readable medium that may include instructions that are executable by the processor. The instructions may include executing one or more unsupervised deep learning methods on the spatial-temporal data acquired by the one or more sensors to cluster the spatial-temporal data as a driving score and applying a trained model to the driving score to determine an aggressive driving behavior risk level. The first edge computing device may be further configured to predict the aggressive driving behavior based on the aggressive driving behavior risk level.

In another example, a system for predicting aggressive driving behavior for a driver of a vehicle is provided that may include one or more edge computing devices configured to acquire short-term time-series data from at least one of one or more sensors that are part of traffic infrastructure and one or more vehicle sensors in the vehicle. The one or more edge computing devices may have a processor and a non-transitory computer-readable medium that may include instructions that are executable by the processor of the one or more edge computing devices. The instructions may include predicting an approach speed of the vehicle to an intersection based on the short-term time-series based data, generating a driving pattern based on the short-term time-series based data, and identifying aggressive driving behavior based on the driving patterns. The instructions may further include predicting a trajectory of the vehicle based on the predicted approach speed of the vehicle and predicting a real-time aggressive driving behavior based on the driving pattern, the identified aggressive driving behavior, and the predicted trajectory of the vehicle.

In even another example, a system for predicting aggressive driving for a driver of a vehicle is provided that may include one or more edge computing devices configured to acquire short-term time-series data and long-term time-series data from at least one of one or more sensors that are part of traffic infrastructure and one or more vehicle sensors in the vehicle. Each of the one or more edge computing devices may have a processor and a non-transitory computer-readable medium including instructions that are executable by the processor of the one or more edge computing devices. The instructions included on the non-transitory computer-readable medium may include: acquiring a multivariate short-term time-series data periodically at a short-term interval; acquiring a univariate short-term time-series data periodically at the short-term interval; and acquiring a multivariate long-term time-series data periodically at a long-term interval. The instructions may further include propagating the multivariate short-term time-series data through a first encoder to output a first hidden state parameter from the first encoder, propagating the univariate short-term time-series data through a second encoder to output a second hidden state parameter from the second encoder, processing the multivariate long-term time-series data with a neural network, and concatenating the first hidden state parameter, the second hidden state parameter, and the processed multivariate long-term time-series data to generate an intermediate vector. The instruction may further include inputting the intermediate vector to a decoder and outputting one or more predicted vehicle speeds from the decoder based on the intermediate vector.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
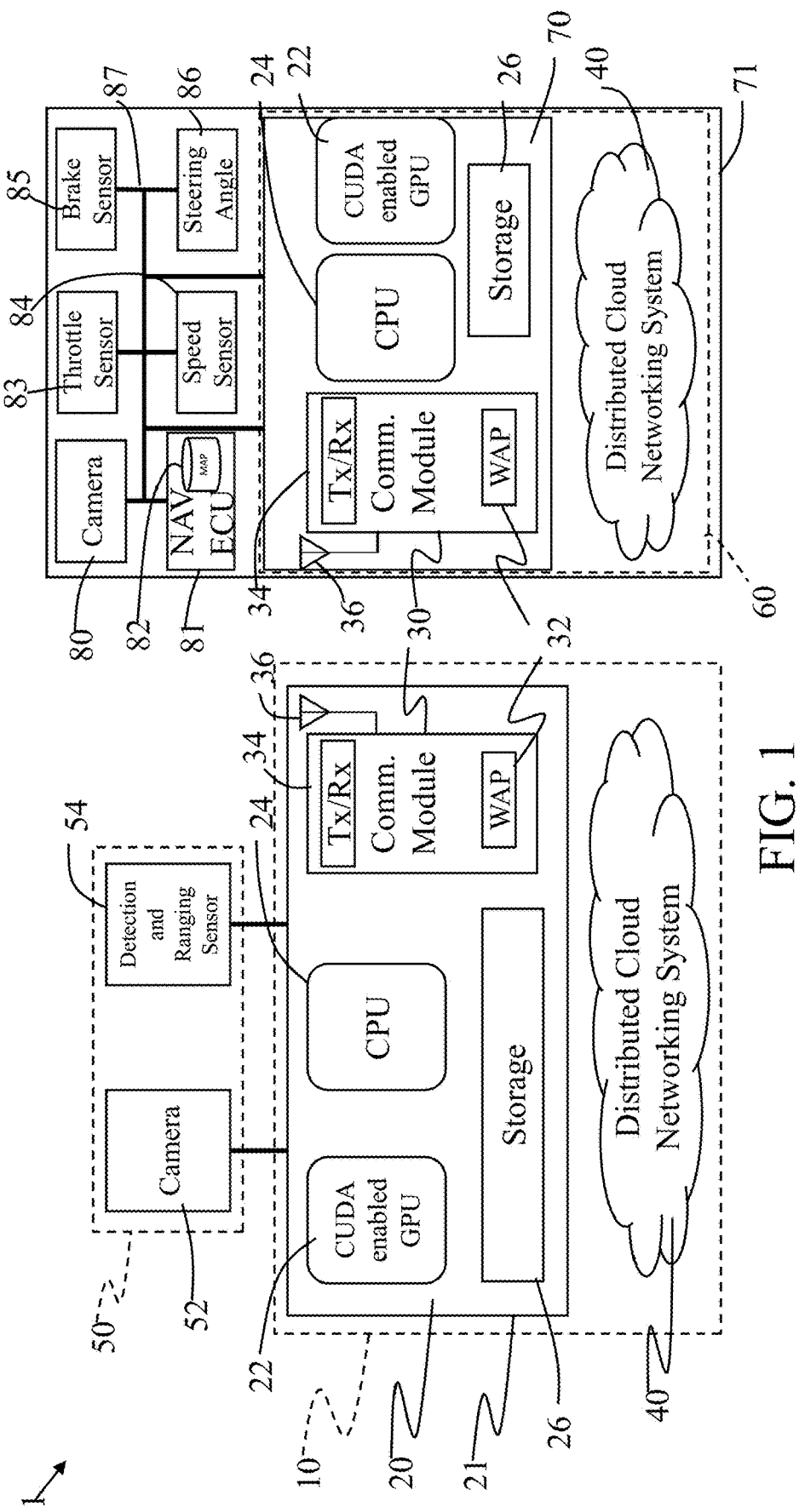
FIG. 1 is a schematic diagram of a system for predicting aggressive driving behavior.

Conventional systems and methods have been attempting to identify risky and aggressive driving behaviors. Examples of aggressive driving include, sudden changes in driving speed, speeding, harsh acceleration and braking, cutting off other drivers, brake checking, preventing other vehicles from merging or changing lanes, the ease of a driver becoming agitated and annoyed with other drivers, frequent honking, lane changes across one or more lanes of traffic in front of other vehicles, passing on the shoulder, and like driving behaviors.

With the rise in the complexity of intelligent transportation systems (ITS) and vehicle automation, quantitative models that can identify and predict aggressive driving behavior in real time are necessary. Such predictive models can be used by vehicle-to-everything (V2X) infrastructure systems and transportation management agencies to reduce crash rates by monitoring drivers, issue warning messages to the vehicles of aggressive drivers, and adjust the parameters of traffic management infrastructure to better control aggressive driving. Aggressive driving behavior models may also be used by automotive manufacturers and suppliers to develop advanced warning and driving assistance systems for vehicle safety.

Some conventional systems and methods for identifying aggressive driving rely on survey data to develop models for predicting driver aggressiveness. For example, conventional modeling has included self-reported accident frequency surveys that assess a driver's anger scale, with aggressiveness levels ranging from "not at all" to "very much." Other example survey techniques investigate personality factors that contribute to a driver's aggressiveness or use a propensity for anger driving scale to measure the aggressiveness in drivers and assign an aggressiveness level to each driver.

However, the resulting survey data used for aggressiveness modeling can be biased, subjective, and often cannot be generalized. For example, survey respondents may have different ideas of what constitutes aggressive driving behavior that can have an effect on modeling. Survey-based modeling often focuses more on the attributes of the driver such as driving experience, age, gender, and the like, but may fail to incorporate environmental and situational context that can affect driving patterns.

Other conventional systems and methods for identifying aggressive driving behavior use data generated from onboard vehicle sensors or other sensors in the vehicle to train models. Some conventional systems and methods may use the sensors on a driver's smartphone to model a driver's driving style. For example, the microphone and camera from a driver's smartphone can be used to capture a driver's utterances and gestures during driving and then compare the captured data to an aggressiveness template to categorize a driver as aggressive or non-aggressive. In addition to using the accelerometer and gyroscopic sensors on a driver's smartphone to capture a vehicle's speed and acceleration, a vehicle's Controller Area Network (CAN) bus can be used by conventional systems and methods to accumulate vehicle sensor data for identifying aggressive driving.

However, while the data-based approaches can provide a closer to real time identification of aggressive driving behavior than survey-based approaches, data-based modeling from conventional systems is often binary and may quantify all aggressive driving behaviors as the same. For example, driving behavior may be classified simply as aggressive, unsafe, non-aggressive, and safe, which may not be sufficient for modeling real-world driving. Using vehicle data to train aggressive driving models may use labeled datasets or templates than can complicate and add subjective bias to the training process. Furthermore, while data-based approaches in conventional systems and methods for identifying aggressive driving behavior are capable of detecting aggressiveness in current driving behavior, the conventional systems and methods cannot forecast future aggressive driving behavior.

Conventional systems and methods for identifying aggressive driving behavior that rely solely on modeling may have limitations. As such, the conventional systems and methods for identifying aggressive driving behavior may also use artificial intelligence (AI) such as machine learning. However, one problem with the deep learning used by the conventional systems and methods is that the model results are based on the training model itself. That is, a good training model outputs good results, whereas a poor training model may provide entirely different outputs.

The system of the present disclosure may be a hybrid learning system using a two-part approach for predicting aggressive driving behavior. The first part includes both infrastructure-side and vehicle-side systems for accumulating vehicle data and data of vulnerable road users (VRUs) and then using unsupervised learning methods on the accumulated data. The second part includes a modeling framework for further constraining the unsupervised learning of the infrastructure-side and/or vehicle-side systems.

Example embodiments are described with reference to the accompanying drawings.

With reference to FIG. 1, a block schematic of a system architecture for predicting aggressive driving behavior is shown. The system for predicting aggressive driving behavior 1 includes a first edge computing device 10 and a second edge computing device 60. Both the first edge computing device 10 and the second edge computing device 60 may have similar components. Accordingly, like components may use the same reference numbers and repeat descriptions of like components may be omitted.

Portions of the first edge computing device 10 may be configured as a roadside unit (RSU) 20 that is integrated into existing roadside infrastructure. For example, with reference to FIG. 2, the RSU 20 may be integrated into the existing infrastructure at an intersection 200 and housed in a traffic cabinet 21. As such, the first edge computing device 10 is intended to be a stationary component of the traffic or intersection infrastructure. In other words, the RSU 20 portion of the first edge computing device 10 may be arranged as a stationary component of the traffic infrastructure.

With reference again to FIG. 1, the first edge computing device 10 and the RSU 20 may be referred to as the "infrastructure side" to differentiate the first edge computing device 10 from the second edge computing device 60.

Parts of the second edge computing device 60 may be an on-board unit (OBU) 70 that is integrated together with the various electronic and computer systems and subsystems in a vehicle 71. For example, the OBU 70 may be configured to communicate with other electronic control units (ECUs) in the vehicle using a CAN bus communication standard. The second edge computing device 60 and the OBU 70 may be referred to as the "vehicle side" to differentiate the second edge computing device 60 and the OBU 70 from the infrastructure side.

In addition to the first edge computing device 10, other components on the infrastructure side may include one or more sensor arrays 50 with one or more cameras 52 and detection and ranging sensors 54 connected to the first edge computing device 10.

While the first edge computing device 10 and the second edge computing device 60 of the system for predicting aggressive driving behavior 1 are described in the singular, the system for predicting aggressive driving behavior 1 is not limited to having one first edge computing device 10 and one second edge computing device 60. For example, each intersection with traffic infrastructure such as traffic control signals may include an RSU 20. In another example, a plurality of RSUs 20 may be disposed along the side of the road and spaced apart from each other based on the sensing range of their sensor arrays 50. In even another example, a plurality of vehicles 71 may be equipped with OBUs 70. Similarly, the system for predicting aggressive driving behavior 1 may include a singular edge computing device, for example, the first edge computing device 10. In instances where the system for predicting aggressive driving behavior 1 includes as a singular edge computing device, either the first edge computing device 10 or the second edge computing device 60 may be referred to simply as the edge computing device without the "first" or "second" designation (e.g., the edge computing device 10).

As compared to conventional computing systems used in conventional systems for identifying aggressive driving behavior, the first and second edge computing devices 10 and 60 have enhanced processing capabilities, lower latency, and faster response times.

For example, with respect to the first edge computing device 10, based on the enhanced computing capabilities, the first edge computing device 10 can better process large amounts of data acquired by the sensor array 50 using AI such as unsupervised machine learning for predicting aggressive driving behavior. By using the AI algorithms, the first edge computing device 10 of the system for predicting aggressive driving behavior 1 can provide aggressive driving predictions in real time with an increased confidence level.

The first edge computing device 10 is configured as a distributed computing system that includes the RSU 20 that networks and communicates with a distributed cloud networking system 40 (i.e., "the cloud"). The RSU 20 includes a graphics processing unit (GPU) 22, a central processing unit (CPU) 24, storage 26, and a communications module 30. The RSU 20 may be housed inside a traffic cabinet 21 at an intersection. The traffic cabinet 21 may include other hardware in addition to the RSU 20 for controlling the traffic signals at an intersection. The RSU 20 of the first edge computing device 10 and the sensor array 50 may be powered directly and/or indirectly from the grid power/utility power used for powering the other electric components at the intersection such as the control signals, pedestrian signals, street lights, electric signage, traffic control signal hardware, and the like. That is, the RSU 20 portion of the driving prediction and interpretation system may be powered by the electrical infrastructure already in place at the intersection. While the RSU 20 of the first edge computing device 10 may be part of a vehicle-to-infrastructure (V2I) system, the RSU 20 of the present disclosure differs from conventional RSUs, in that the RSU 20 includes both enhanced onboard and cloud-based computational abilities for executing parallel computations using AI algorithms.

The GPU 22 is a processor that includes various interfaces such as a bus interface and a display interface, a video processing unit (VPU), a graphics memory controller (GMC), a compression unit, and a graphics and computer array (GCA), among other components (all not shown). The GPU 22 supports massive threading and parallel computing and is a CUDA-enabled GPU. CUDA is an abbreviation for Compute Unified Device Architecture and is a registered trademark of the Nvidia Corporation. CUDA is a parallel computing platform and application programming interface that allows the GPU 22 to be used for general purpose parallel processing. While CUDA is used as an example to support parallel computing, the GPU 22 may use an alternative platform and application programming interface (API) for parallel processing.

By using the GPU 22, large blocks of data can be used in calculations with AI algorithms more effectively and efficiently than the same calculations using the CPU 24. Such AI algorithms may include, for example, dynamic time warping (DTW), hidden Markov models (HMM), and the Viterbi algorithm.

DTW is an algorithm used in time series analysis to measure the similarity between two temporal series/sequences that may vary in speed. For example, the speed and/or acceleration of one vehicle 71 and the speed and/or acceleration of another vehicle 71 can be processed with DTW to measure similarities between the speeds and/or accelerations of the two vehicles 71. The system for predicting aggressive driving behavior 1 can use DTW to measure the similarities of spatial-temporal data for vehicles 71 measured by sensors in the system 1.

The GPU 22 allows the first edge computing device 10 to more quickly execute parallel calculations using AI algorithms to analyze and process measurements from the sensor array 50 in real time to predict the trajectories of the vehicles 71 and predict aggressive driving behavior of the vehicles 71 based on the sensor data from the sensor array 50. The GPU 22 may be used with AI algorithms to process and analyze the spatial-temporal data of the vehicles 71 as acquired by the sensor array 50. For example, the GPU 22 may use the spatial-temporal data from the vehicles 71 to compute a DTW-based dissimilarly score for each of the vehicles 71, and the DTW scores may be used with trained models to predict aggressive driving behavior risk levels for each of the vehicles 71. The computed DTW scores may also be forwarded by the CPU 24 to the storage 26 for later use. After the edge computing device retrieves the next set of spatial-temporal data of the vehicles 71 from the sensor array 50 (e.g., vehicle trajectory data), the GPU 22 can retrieve the DTW scores from the storage 26 to update the DTW scores based on the most recent spatial-temporal data of the vehicles 71.

The CPU 24 may be a processor for executing less computational intensive programs and instruction sets than the GPU 22. The CPU 24 may also be configured as a microcontroller or as a System on Chip (SoC). For example, the CPU 24 may execute programs and instruction sets for transferring data between the storage 26, the GPU 22, and the communication module 30. The CPU 24 may also be used for controlling the communication module 30 to transfer and receive data from the distributed cloud networking system 40.

In one example embodiment, the CPU 24 may use the computed DTW scores from the GPU 22 with trained models from the distributed cloud networking system 40 to predict risk levels of the vehicles 71 for aggressive driving behavior. The prediction results can be sent from the CPU 24 via the communication module 30 to intelligent transportation systems (ITS) and vehicle-to-everything (V2X) infrastructure where such prediction results may be used to send aggressive driving alerts to the vehicles 71 that are driving aggressively, or be used by the traffic control infrastructure (e.g., traffic signals) to mitigate the aggressive driving behavior.

The CPU 24 may also be used as an input/output for receiving and transmitting data to/from the sensor array 50. Alternatively, the communication module 30 may be used for communications between the RSU 20 and the sensor array 50.

The storage 26 may be a memory such as random-access memory (RAM), read-only memory (ROM) and flash memory, and/or a storage device such as a magnetic hard drive (HDD) or a solid-state drive (SSD) using flash memory. The storage 26 may be used to store DTW scores and the complete trajectory data of the vehicles 71, in addition to pre-trained models used by the AI algorithms executed by the GPU 22. The complete trajectory data of the vehicles 71 may be forwarded from storage 26 via the CPU 24 and the communication module 30 for further processing by the distributed cloud networking system 40 for updating the training model parameters. The storage 26 may also store programs, instruction sets, and software used by the GPU 22 and the CPU 24. The storage 26 storing programs, instruction sets, and software that can be executed by the processors, such as the GPU 22 and the CPU 24, is an example of the storage 26 being a non-transitory computer-readable medium. The storage 26 may also be referred to generally as a non-transitory computer-readable medium.

The communication module 30 allows the RSU 20 of the first edge computing device 10 to transmit and receive signals and data with external systems, devices, and networks. Generally, the communication module 30 may be used to input and output signals and data to and from the RSU 20. The communication module 30 may be used to receive messages from other connected infrastructure such as signal phase and timing (SPaT) messages from traffic and pedestrian control signals, basic safety messages (BSMs) from vehicles having dedicated short-range communication (DSRC) and connected to a vehicle-to-everything (V2X) system, and personal safety messages (PSMs) from pedestrians and cyclists connected to the V2X system (e.g., by a mobile phone). The communication module 30 may also be used to broadcast SPaT messages and intersection Map Data (MAP) messages to connected road users.

The communication module 30 may include a wireless access point (WAP) 32, gateway, or like networking hardware to wirelessly connect the RSU 20 to an external network such as a wireless local area network (WLAN) or local area network (LAN). For example, the WAP 32 may be configured to communicate wirelessly using an Institute of Electrical and Electronics Engineers (IEEE) 802.11 protocol. Alternatively, or in addition to the WAP 32, the communication module 30 may include a transmitting and receiving device 34 that is configured to communicate either wirelessly or by wire with external devices. The transmitting and receiving device 34 may be, for example, a transceiver, a modem, and a network switch. For example, the transmitting and receiving device 34 may be a cellular transceiver 34 configured to transmit and receive cellular signals at cellular allocated frequencies. As such, the cellular transceiver 34 may be configured for mobile telecommunication and cellular network technologies such as 2G, 3G, 4G LTE, and 5G for transmitting and receiving data to provide mobile broadband capabilities to the RSU 20. A cellular transceiver 34 can connect the RSU 20 to a wireless wide area network (WWAN) or WAN. Generally, the communication module 30 may be configured for wired and wireless communications using common communication standards and technology such as IEEE 802.3, IEEE 802.11, Bluetooth, mobile broadband, and the like.

The communication module 30 may be connected by wired connection or wirelessly with the sensors of the sensor array 50. The communication module 30 may also include one or more antennas 36 for transmitting radio signals from the communication module 30 and receiving radio signals at the communication module 30. Alternatively, both the WAP 32 and the transmitting and receiving device 34 may respectively include one or more individual antennas.

The distributed cloud networking system 40 (i.e., "the cloud") is one or more cloud computing elements that is part of the first edge computing device 10. The distributed cloud networking system 40 provides additional resources like data storage and processing power to the first edge computing device 10. For example, the distributed cloud networking system 40 may be used for processing with high computational loads to reduce the computational load on the RSU 20. Because the distributed cloud networking system 40 is accessible over the Internet, the distributed cloud networking system 40 is configured to communicate with the RSU 20 of the first edge computing device 10 via the communication module 30.

The distributed cloud networking system 40 may include any number or different services such as infrastructure as a service (IaaS), platform as a service (PaaS), software as a service (SaaS), backend as a service (BaaS), serverless computing, and function as a service (FaaS). The distributed cloud networking system 40 may be a commercial cloud computing service such as Amazon Web Services (AWS), Microsoft Azure, Google Cloud Platform (GCP), or Oracle Cloud, all registered trademarks. The distributed cloud network system 40 may also use services provided by the commercial cloud computing service. For example, all the edge computing devices used in the system for predicting aggressive driving behavior may use a service such as AWS Greengrass, a registered trademark, to perform data collection and analysis closer to the data's origin. Edge computing devices in the system for predicting aggressive driving behavior 1 may use a service such as AWS Greengrass to communicate with each other.

In addition to the AI algorithms used by the GPU 22 to calculate DTW scores for the vehicles 71, the distributed cloud networking system 40 may be used to train prediction models and run simulations that can be used by the GPU 22 and CPU 24 to better predict aggressive driving behavior. Complete trajectories of the vehicles 71 stored in the storage 26 may be sent to the distributed cloud networking system 40 to update the parameters of the training models. The vehicle trajectories from the storage 26 may be sent to the distributed cloud networking system 40 at periodic intervals throughout the day or alternatively as a batch. For example, the vehicle trajectories from the storage 26 may be sent as a batch during times when the computational load of the RSU 20 is low, such as during early morning hours.

While the description may describe specific components of the first edge computing device 10 performing a function or process, the first edge computing device 10 generally performs the same function or process described as being performed by the subsystem or sub-component of the first edge computing device 10. That is, higher level components can also be described as performing the same functions as their subsystems and sub-components. For example, while the GPU 22 is described as performing calculations using AI algorithms, both the first edge computing device 10 and the RSU 20 can also be described as performing calculations using AI algorithms.

The processes and functions performed by both the first edge computing device 10 and the second edge computing device 60 may be based on the execution of a program or instruction set (i.e., "instructions") stored on a non-transitory computer read-able medium (e.g., RAM, ROM, flash memory as storage 26) by a processor (e.g., GPU 22, CPU 24). The execution of the instructions by the processor cause the processor, or more generally the first edge computing device 10 and the RSU 20, or the second edge computing device 60 and the OBU 70, to perform the instructions as processes/functions, for example, to perform the control framework in FIG. 4 and modeling modules in FIGS. 5 and 6.

The sensor array 50 includes sensors that are used to acquire spatial-temporal data from the vehicles 71 and other road users around the intersection. The sensor data from the sensor array 50 can be used by the GPU 22 to calculate the DTW scores for the vehicles 71, which may then be used by the CPU 24 with trained models to make risk level predictions of aggressive driving behavior. Relative to the vehicles 71, the sensor array 50 is both external to the vehicles 71 (i.e., outside of the vehicles 71) and remote from the vehicles (i.e., disposed at a distance away from the vehicles 71). The sensor array 50 is also a stationary component that is part of the traffic/intersection infrastructure.

With reference again to FIG. 2, the system for predicting aggressive driving behavior 1 may include one or more sensor arrays 50 at different locations around the intersection 200 to obtain a three hundred sixty degree (360°) view and sensing area of the intersection 200. The one or more sensor arrays 50 at the intersection 200 may provide a viewing and sensing area, for example, with a two to three hundred meter radius centered at the intersection. That is, the camera 52 and detection and ranging sensors 54 in the sensor array 50 have a range of about two to three hundred meters from the intersection.

With reference again to FIG. 1, each sensor array 50 may include one or more cameras 52 and one more detection and ranging sensors 54. While the camera 52 and the detection and ranging sensor 54 are described as being part of a sensor array 50, the camera 52 and the detection and ranging sensor 54 are not necessarily limited to this configuration and may be disposed separately and in different locations around the intersection 200. Alternatively, instead of the sensor array 50 having a combination of cameras 52 and detection and ranging sensors 54, the sensor array 50 may be limited to either (i) an array of one or more cameras 52 oriented at different angles and different directions, or (ii) an array of one or more detection and ranging sensors 54 oriented at different angles and different directions. In these alternative configurations of the sensor array 50, the sensor array 50 may be referred to either more specifically as the camera array 50 or the ranging sensor array 50 when one type of sensor is used in the sensor array 50.

The camera 52 may be a normal optical device relying on natural light to capture images. The camera 52 may be configured to capture individual images or a video stream. For example, the camera 52 may be configured to capture sequential images or real-time video of vehicles 71 and other road uses at a predefined interval or frame rate with the captured images/video being used by the GPU 22 to determine DTW scores and predict trajectories for each vehicle 71.

Images and videos captured by the camera 52 may be further processed by the GPU 22 with machine vision algorithms to identify and track all vehicles 71 and other road users within the viewing range of the camera 52 (e.g., two to three hundred meters).

The camera 52 may include additional enhancements to reduce the camera's reliance on natural light. For example, the camera 52 may include artificial lights and flashes to provide better image capturing capabilities. The camera may also include advanced sensors such as a complementary metal-oxide-semiconductor field-effect transistor (CMOS) sensor for better capturing images in poor or low lighting conditions. Such sensors may be combined with artificial light such as infrared lighting for low light imaging and night vision capabilities. Alternatively, the camera 52 may be a thermographic camera such as an infrared camera or a thermal imaging camera for capturing images of the vehicles 71 and other road users by using the heat signatures of the vehicles and other road users.

While the RSU 20 may use machine vision algorithms on the image data captured by the camera 52 to identify and track the vehicles 71 and other road users around the intersection 200, sequential still images and video streams of vehicles 71 and other road users captured by the camera 52 may be processed by the GPU 22 to generate spatial-temporal data for all road users around an intersection. Spatial-temporal data acquired by the camera 52 may include the trajectory, path, direction, bearing, and azimuth for all the tracked vehicles 71 and other road users. For example, image data captured by the camera 52 may be used to identify the trajectories and changes in the trajectories of the vehicles 71 and other road users. The GPU 22 may also use image and video data from the camera 52 to calculate speed and acceleration of the vehicles 71 and other road users, but this data may be better acquired by the detection and ranging sensor 54. The spatial-temporal data can be further processed by the GPU 22 with AI algorithms to calculate DTW scores and predict the trajectories of the vehicles around the intersection 200.

In addition to tracking the movement of the vehicles 71 and other road users to generate spatial-temporal data for the vehicles 71 and other road users, the camera 52 may be used to capture other data around the intersection 200. For example, the camera 52 may be used to monitor the road condition and detect objects in the road such as pedestrians, cyclists, animals, potholes, roadkill, lost loads, refuse, and the like, all of which may cause vehicles 71 to swerve or brake to avoid the object. That is, the camera 52 may correlate the detected object to the trajectories, speeds, and accelerations of the vehicles to calculate driving behavior patterns for the vehicles 71. For example, if vehicles 71 in the road are swerving to avoid a pothole, the GPU 22 may correlate the pothole to changes in the trajectories of the vehicles 71 when determining the predicted trajectories of the vehicles 71. Such data can be used by the GPU 22 and applied to the AI algorithms to better predict aggressive driving behavior of the vehicles 71 in view of such objects.

Likewise, the camera 52 may be used to monitor weather conditions to determine if the weather may affect the driving behavior of the vehicles 71. For example, rain and snow may affect the road surface causing a more slippery road surface and requiring extra time for vehicles 71 to slow to a stop or necessitating extra care in driving on such weather-affected road surfaces. Such information can be used by the GPU 22 to detect changes in the trajectories, speeds, and accelerations of the vehicles 71 to predict driving behaviors. The GPU 22 may correlate such weather conditions to the trajectory, speed, and acceleration data acquired by the sensor array 50 and factor these conditions into the driving predictions by the GPU 22. That is, the weather data acquired by the camera 52 can be used by the GPU 22 and applied to the AI algorithms to better predict the driving behaviors of the vehicles 71 in view of such weather conditions. The camera 52 can also be used to determine time of day, lighting conditions, and visibility.

The sensor array 50 may also include one or more detection and ranging sensors 54. The detection and ranging sensor 54 may be configured to output a radio wave, receive the reflected radio wave, and measure a time from outputting the radio wave to receiving the reflected radio wave. The time measurement from the sensor 54 can be used as a basis for detecting a vehicle 71 and other road users and calculating the speed and acceleration of the vehicle 71 and the other road users.

For example, the detection and ranging sensor 54 may output a radio wave toward the vehicle 71 and other road users and receive the radio wave reflected from the vehicle 71 and other road users to detect and measure the speed and acceleration of the vehicle 71 and other road users. As such, the detection and ranging sensor 54 may be a radar sensor 54.

The detection and ranging sensor 54 may also be configured to output a light, such as infrared laser light, receive the reflected light, and measure a time from outputting the light to receiving the reflected light. By measuring a time to receive the reflected light, the detection and ranging sensor 54 can use the time measurement as the basis for detecting a vehicle 71 and other road users and for measuring the speed and acceleration of the vehicle 71 and other road users. As such, the detection and ranging sensor 54 may be a light detection and ranging (lidar) sensor.

The sensor array 50 may include one or more lidar and radar sensors 54 or a combination of lidar and radar sensors 54. The speeds and accelerations detected by the detection and ranging sensor 54 may be used by the GPU 22 using AI algorithms to predict the trajectories and driving behaviors of the vehicles 71 around the intersection 200. The spatial-temporal data acquired by the ranging sensor 54 may also be used by the RSU 20 to calculate and predict the trajectories and behaviors of other road users around the intersection 200 as well.

The sensor array 50, or individual cameras 52 and detection and ranging sensors 54, may be statically mounted at intersections to acquire a three hundred sixty degree (360°) view around the intersection. For example, at a four-way intersection, a sensor array 50 or individual cameras 52 and/or detection and ranging sensors 54 may be installed to acquire data for each of the four junction roads approaching the intersection (i.e., each junction road having a dedicated sensor array 50). In this example, each sensor array 50 (or camera 52 and detection and ranging sensor 54) may be configured to have a ninety degrees (90°) or greater field of view for each of the junction roads approaching the intersection. Additional sensors arrays 50 or individual cameras 52 and/or detection and ranging sensors 54 may be installed to provide a three hundred sixty degree (360°) view within the intersection itself.

The spatial-temporal data acquired by the sensor array 50 may be acquired by the RSU 20 at a predetermined interval or frequency for predicting vehicle trajectories and calculating vehicles DTW scores. For example, the RSU 20 may acquire the spatial-temporal data from the sensor array 50 at a frequency of 10 Hz (i.e., every tenth of a second).

With reference again to FIG. 2, the system for predicting aggressive driving behavior 1 may be used as part of the traffic infrastructure at the intersection 200. Example traffic infrastructure at the intersection 200 includes traffic control signals 202 to regulate the flow of road users such as vehicles 71 and cyclists 91 through the intersection 200 and pedestrian control signals 204 to regulate the flow of pedestrians 93 crossing the streets that forms the intersection 200. Markings such as stop lines 206 may be used in conjunction with the traffic control signals 202 to regulate the flow of road users 71, 91, and 93 through the intersection 200. Generally, the vehicles 71, cyclists 91, and pedestrians 93 may be referred to as "road users." However, the cyclists 91 and the pedestrians 93 may be referred to as vulnerable road users (VRUs) as they are more vulnerable to collisions.

Figure 2:
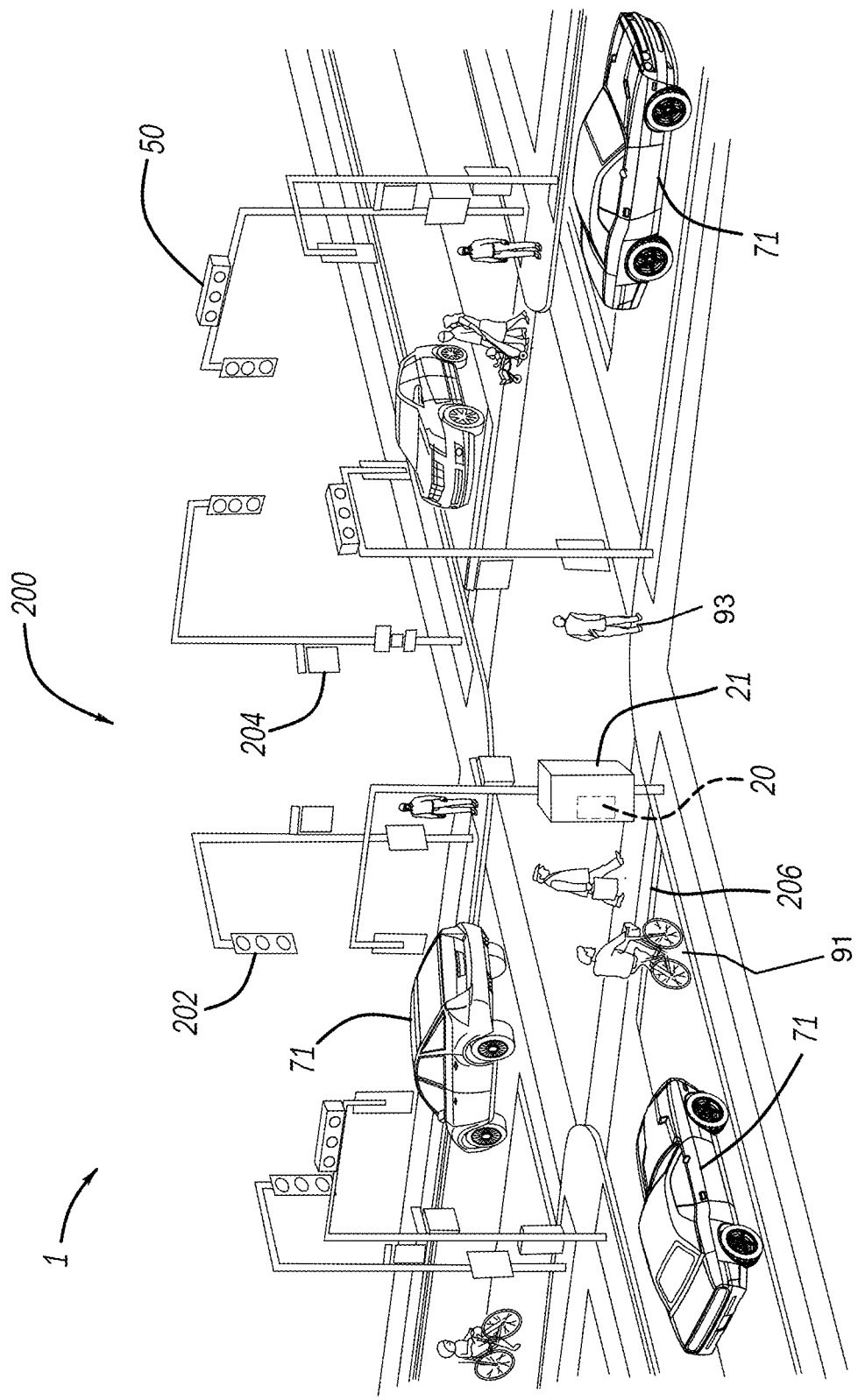
FIG. 2 is an example use environment of the system for predicting aggressive driving behavior.

While a four-way intersection 200 is shown in FIG. 2, the system for predicting aggressive driving behavior may also be used at more complex intersections with a greater number of junction roads, at roundabouts, and at intersections with less junction roads (e.g., three-way intersections). The use of the system for predicting aggressive driving behavior is not limited to the intersection 200 and may be also be employed at different locations along roads.

With reference now to both FIGS. 1 and 2, the RSU 20 can determine the status of the traffic control signals 202 and the pedestrian control signals 204 through a wired or wireless connection. That is, the RSU 20 is configured to receive SPaT messages from the traffic control signals 202 and 204 to determine the status of the traffic control signals 202 and 204. Alternatively, the RSU 20 may determine the status of the traffic control signals 202 and 204 by the cameras 52.

The image and motion data acquired by the sensor arrays 50 is used by the RSU 20 with AI algorithms to predict the trajectories and aggressive driving behavior of the vehicles 71 around the intersection 200. That is, the sensor arrays 50 collect data to detect, localize, and track the vehicles 71 in and around the intersection 200. The RSU 20 may use image processing and machine vision to identify and track the vehicles 71. The RSU 20 can then use the detection and ranging sensors 54 to acquire measurements for determining the spatial-temporal data of the vehicles 71 such as geolocation, trajectory, path, direction, speed, and acceleration.

The data acquired by the sensor arrays 50 can be used by the RSU 20 to compute proxy BSMs for the vehicles 71. That is, the RSU 20 can compute proxy spatial-temporal data for the vehicles 71 in lieu of, or in addition to, sensors on the vehicle side gathering spatial-temporal data to compute a BSM for the vehicle 71. The RSU 20 can then use the proxy spatial-temporal data (i.e., proxy BSMs) alone, or with BSMs from the vehicles 71, with AI algorithms to predict the driving behaviors of the vehicles 71.

The proxy BSMs calculated by the RSU 20 may include a subject vehicle's speed and acceleration in addition to the subject vehicle's distance to the stop line 206, the distance from the subject vehicle to a lead vehicle (i.e., a vehicle traveling in front of the subject vehicle), the velocity and acceleration of the lead vehicle, the heading or steering wheel angle of the subject vehicle, and the status of the traffic control signals 202. The proxy BSMs for the vehicles 71 can be processed by the GPU 22 with AI algorithms to calculate DTW scores of the vehicles 71 as a basis for determining the risk of aggressive driving behavior by the vehicles 71.

Similarly, the spatial-temporal data for the VRUs 91 and 93 acquired by the sensor arrays 50 may be used by the RSU 20 to calculate proxy PSMs for the VRUs 91 and 93. The proxy PSMs may include data such as the heading, trajectories, and speed of the VRUs 91 and 93.

With reference again to FIG. 1, on the vehicle side, the vehicles 71 may include the OBU 70 in addition to other sensors and systems such as a camera 80, a navigation ECU 81 (i.e., vehicle navigation system), a throttle sensor 83, a speed sensor 84, a brake sensor 85, and a steering wheel angle sensor 86. The other sensors and systems 80-86 may be interconnected to each other via a bus 87, for example, a CAN bus. Vehicle data acquired by the bus 87 may be referred to as CAN data.

The driving behavior prediction and interpretation system 1 may include vehicles that are enabled for DSRC for communicating with V2X systems. For example, a vehicle 71 enabled for DSRC may use communication module 30 to communicate with the communication module 30 of the RSU 20. DSRC-enabled vehicles 71 may transmit BSMs to the RSU 20 for processing with the proxy BSMs and PSMs calculated by the RSU 20 to predict the driving behaviors of the vehicles 71. Similarly, DSRC-enabled vehicles 71 may receive the proxy BSMs and PSMs from the RSU 20 via the communication module 30.

The system for predicting aggressive driving behavior 1 is not limited to DSRC-enabled vehicles 71. For vehicles lacking OBUs 70, the RSU 20 may be used to calculate proxy BSMs. The proxy BSMs alone can be used by the system for predicting aggressive driving behavior 1 to predict aggressive driving behavior for vehicles without an OBU 70.

For DSRC-enabled vehicles 71, the vehicles 71 may transmit CAN data from vehicle sensors, such as the throttle sensor 83, the speed sensor 84, the brake sensor 85, and the steering wheel angle sensor 86 via the bus 87 to the communication module 30 of the OBU 70. The OBU 70 may then transmit the throttle opening rate, velocity, brake pressure, and steering wheel angle of the vehicle, as part of a BSM, to the RSU 20 via the communication module 30. The CAN data from DSRC-enabled vehicles 71 can be used in addition to the proxy BSMs and PSMs calculated by the RSU 20 to predict the trajectories and driving behaviors of the DSRC-enabled vehicles 71. That is, DSRC-enabled vehicles 71 may transmit BSMs to the RSU 20 for the RSU 20 to use as the basis for predicting aggressive driving behavior of DSRC-enabled vehicles 71. Alternatively, or in addition to using the BSMs from the DSRC-enabled vehicles 71 as a basis for predicting aggressive driving behavior, the BSMs from the DSRC-enabled vehicles 71 may be used by the RSU 20 as ground truths to verify the accuracy of the corresponding proxy BSMs calculated by the RSU 20 using spatial-temporal data acquired by the sensor array 50.

While the components of the OBU 70 function the same as the components of the RSU 20, certain example embodiments of the OBU 70 may not include all the components of the RSU 20. For example, in one example embodiment, the OBU 70 may not include the GPU 22. In this example, DSRC-enabled vehicles 71 in communication with each other via V2X infrastructure may share the computational burden among each other in a distributed networking arrangement so as to eliminate the GPU 22 from the OBU 70. That is, the GPU 22 may be an optional component of the OBU 70. In this way, each vehicle 71 in the V2V network may use the CPU 24 in the OBU 70 to calculate the predicted trajectory of the vehicle based on data from the vehicle sensors (e.g., sensors 83, 84, 85, and 86) with the CPU 24 also calculating the DTW score for the vehicle.

Here, the CPU 24 may use the DTW score with trained models from the distributed cloud networking system 40 to predict the risk level of aggressive driving behavior. The CPU 24 of the OBU 70 may then send the prediction results via the communication module 30 to the RSU 20, other infrastructure, and surrounding vehicles 71. Compared to the infrastructure-side architecture where the GPU 22 of the RSU 20 is responsible for calculating the risk and trajectory predictions for all vehicles 71 around an intersection 200, calculations by the vehicle-side architecture may not require such massive threading and consequently eliminate the GPU 22 from the OBU 70 and rely on the CPU 24 alone for calculating the DTW score, predicting the trajectory, and predicting the risk level for aggressive driving behavior of the subject vehicle.

However, DSRC-enabled vehicles 71 may include a GPU 22 in the OBU 70. In such cases, the GPU 22 in the OBU 70 may calculate to the DTW score of the vehicle based on spatial-temporal vehicle data acquired from onboard vehicle sensors.

The camera 80 may be used to capture image data for information that cannot be ascertained by a proxy BSM. For example, the camera 80 may be a forward-facing camera and be used to capture data related to a pedestrian passing in front of the vehicle 71, traffic signs in front of the vehicle, bicyclists in front of the vehicle, and the like. The information from the image data captured by the camera 80 may be either processed by the OBU 70 or transmitted to the RSU 20 for further processing. That is, such information may be used by either the RSU 20 and/or the OBU 70 with other data for predicting and interpreting the driving behavior of the vehicle.

The navigation ECU 81 may include map data 82 for a map API and be configured to operate as the navigation system for the vehicle 71. For example, the navigation ECU 81 can display a navigation map on a display in the vehicle (not shown). The navigation ECU 81 may also include, or be connected to, a global positioning system (GPS) (not shown). The GPS may be a satellite GPS that can provide a global position of the vehicle 71. Trajectory data from the navigation map may be used as the basis for driving behavior prediction. For example, upcoming turn information may be used to predict the driving behavior of a vehicle. The trajectory data from the map API can be used to determine the current geo-location of the vehicle 71, predict the geo-location of the vehicle 71 in the next five meters, the next ten meters, the next fifteen meters, the next twenty meters, and the like. In lieu of distance-based future predictions, time-based future predictions may also be used. For example, the trajectory data from the map API can be used to predict the geo-location of the vehicle 71 in the five seconds, ten seconds, and the like.

For vehicles equipped with an OBU 70, the proxy BSMs and PSMs calculated by the RSU 20 may be transmitted to the OBU 70 for onboard calculations to predict aggressive driving behavior. For vehicles without an OBU 70, only image data from the camera 80, trajectory data from the navigation ECU 81, and vehicle sensor data is available for onboard calculations and predictions.

While the system for predicting aggressive driving behavior 1 includes the first edge computing device 10 on the infrastructure side and the second edge computing device 60 on the vehicle side, the system for predicting aggressive driving behavior 1 is not limited to this configuration. For example, some vehicles 71 may not be equipped with DSRC equipment for V2V communications. As such, the infrastructure-side elements such as the first edge computing device 10 may be used alone to predict vehicle trajectories, assess the risk of aggressive driving, and output measures to mitigate the effects of aggressive driving. As more and more vehicles 71 become equipped with DSRC equipment for V2V communications, the vehicle-side architecture may play a larger role in the prediction, assessment, and mitigation of aggressive driving with less of a reliance on the infrastructure-side equipment. However, in such example cases, the infrastructure-side architecture including the first edge computing device 10 may still remain in place for redundancy purposes. For example, if the DSRC equipment for V2V communication in a vehicle 71 malfunctions, the first edge computing device 10 can still be used to predict, assess, and mitigate aggressive driving.

The first edge computing device 10 and the second edge computing device 60 may use unsupervised learning AI to identify and forecast aggressive driving in a connected vehicle environment. For vehicles 71 approaching the intersection 200, the system for predicting aggressive driving behavior 1 maps the trajectory of the vehicles 71 into a set of previously-constructed centroid clusters, where each cluster is associated with a probabilistic measure of aggressiveness. As the vehicles 71 approach the intersection 200, more and more spatial-temporal data for updating vehicle trajectory is acquired, allowing the system for predicting aggressive driving behavior 1 to monitor and predict the driving behavior in real-time and take action when necessary. Based on the spatial-temporal data acquired from the sensor array 50 and sensors in the vehicle 71, the system for predicting aggressive driving behavior 1 uses multi-dimensional, time series inputs that include measures of vehicle motion, energy consumption, and force, that is, measures that can be used to differentiate different driving styles.

The general methodology for predicting aggressive driving behavior uses a DTW-based time series K-means algorithm to categorize the multi-dimensional time series trajectories of the vehicles 71 into several clusters that correspond to different driving patterns. Driving patterns of the vehicles 71 at the intersection 200 capture the differences in driving styles between the vehicles 71 relative to contextual data, such as the status of the traffic control signal 202 as the vehicle 71 approaches the intersection 200. An isolation forest training model developed in the distributed cloud networking system 40 can then be applied to the clusters to assign an aggressiveness score to each driving patterns to assess the aggressive driving behavior risk for each of the vehicles 71.

The spatial-temporal data of the BSMs and proxy BSMs is used by the system for predicting aggressive driving behavior 1 as the basis for forming a multi-dimensional feature vector that can be used to assess a level of aggressive driving behavior. The system for predicting aggressive driving behavior 1 may construct a number of features separately for each time step t, with the features being concatenated over multiple time steps $t_n$, to form the feature vectors for each of the vehicles 71. Such features in the vector may include relative location measure $d_t$, vehicle motion measures such as velocity $v_t$ and acceleration $a_t$, energy measure $\Delta v_t^2$, and force measure $\Delta a_t$.

The relative location measure $d_t$ is a distance of a vehicle 71 to the stop line 206 at the intersection 200 at a time step t.

The vehicle velocity $v_t$ is the velocity of the vehicle 71 at a time step t. As aggressive drivers are more likely to drive over the speed limit, the velocity $v_t$ may be one of the most important indicators of aggressive driving behavior.

The vehicle acceleration $a_t$, is the acceleration of the vehicle 71 at a time step t. The vehicle acceleration $a_t$ is a measure of the change in the velocity $v_t$ of the vehicle 71, as given by Equation 1.

$$(a_t = (v_t - v_{t-1})/\Delta t)$$ Equation 1

Aggressive drivers may typically accelerate or apply the brakes more harshly than other drivers to achieve a rapid change in acceleration or speed. A vehicle energy measure $\Delta v_t^2$ can be used to capture such aggressive actions. From a mechanics perspective, the functionality of the brakes on a vehicle are to change the vehicle's kinetic energy into other forms of energy such as thermal energy, while the accelerator on a vehicle increases the kinetic energy of the vehicle to facilitate motion. The kinetic energy $E_t$ of a moving vehicle 71 with mass m and velocity $v_t$ at time step t can be calculated by Equation 2.

$$E_t = \tfrac{1}{2} m v_t^2$$ Equation 2

At any time step t, a change in kinetic energy $\Delta E_t$ can be calculated using Equation 3.

$$\Delta E_t = \tfrac{1}{2} m (v_t^2 - v_{t-1}^2)$$ Equation 3

Equation 3 can be simplified as $\Delta E_t \propto \Delta v_t^2$.

With respect to the force measure $\Delta a_t$ of the vehicles 71, Newton's second law, where force $F_t$ is equal to mass m multiplied by acceleration $a_t$, is the force that moves the vehicles 71. As such, a change in acceleration between two consecutive time steps can capture the change in a vehicle's tractive efforts, as given by Equation 4.

$$\Delta F_t = m \Delta a_t$$ Equation 4

Equation 4 can be simplified as $\Delta F_t \propto \Delta a_t$.

The force measure $\Delta a_t$ and energy measure $\Delta v_t^2$ capture fundamentally different aspects of vehicle motion. While both measures $\Delta a_t$ and $\Delta v_t^2$ use a compressed memory of braking and/or acceleration based on a history of vehicle trajectory, the force measure $\Delta a_t$ makes use of a longer vehicle trajectory history compared to the energy measure $\Delta v_t^2$.

While the system for predicting aggressive driving behavior 1 can identify the aggressive driving behaviors of the vehicles 71 at the intersection 200, the system for predicting aggressive driving behavior 1 can also predict the levels of aggressiveness for the vehicles 71 based on the real-time trajectories of the vehicles 71 as they approach the intersection 200. The feature space of the vehicles 71 is formed by concatenating the most recent ten seconds of trajectory information for the vehicles 71 before the vehicles 71 reach the stop line 206 at the intersection 200. With an example data transmission/acquisition rate of 10 Hz, the trajectory sequence (i.e., feature space) for a vehicle 71 is given by Equation 5.

$$f = [(v_1, a_1, \Delta v_1^2, \Delta a_1, d_1), (v_2, a_2, \Delta v_2^2, \Delta a_2, d_2), \ldots, (v_{99}, a_{99}, \Delta v_{99}^2, \Delta a_{99}, d_{99})]^T$$ Equation 5

In contrast to related technologies using manual labeling to prepare training sets, the system for predicting aggressive driving behavior 1 uses unsupervised machine learning to cluster vehicle trajectories into a number of different driving patterns. The system for predicting aggressive driving behavior may use a K-means-based clustering algorithm (i.e., "K-means algorithm") as part of the unsupervised machine learning method for clustering vehicle trajectories. As the example trajectory sequence (i.e., feature space) given in Equation 5 is a time series sequence, a K-means algorithm does well clustering time series data. Given a set of observations (e.g., $x_1, x_2, x_3, \ldots, x_n$) and k clusters, a K-means algorithm can partition the data to minimize the sum of intra-cluster variances. Based on Lloyd's algorithm, a K-means algorithm may begin by randomly selecting K objects as cluster centers (i.e., centroids). By using an iterative process, a K-means algorithm can repeat a two-step process where: (i) a first step includes assigning each data point in the data set to its nearest centroid based on a distance measurement function dist ($c_i$, x), where C={$c_i$} is the set including all cluster centroids and x is a point in the data sets; and (ii) a second step includes updating each cluster centroid by calculating the mean of objects in the cluster, as given by Equation 6, where $s_i$ is the size of cluster i.

$$c_i = \frac{\sum_{j=1}^{s_i} x_j}{s_i} \quad \text{Equation 6}$$

The K-means algorithm uses a Euclidean distance function so that the algorithm converges in a finite number of iterations. Convergence criteria are reached when the cluster centers do not change.

The number of clusters in the K-means algorithm is an input parameter and cannot be endogenously determined by the K-means algorithm. Consequently, the system for predicting aggressive driving behavior 1 can use the elbow method to heuristically determine the number of clusters. The elbow method determines the number of clusters based on an elbow score that is computed as the sum of the intra-cluster variances. As such, a higher number of clusters will result in a smaller elbow score. The elbow method selects the number of clusters based on the elbow score curve or plot, that is, a graphical representation of the elbow score. The number of clusters is based on the position of the elbow score curve (i.e., the elbow) where the slope changes from steep to slow or gradual.

By treating each time series trajectory as a high-dimensional data point in the dataset, time series clustering can be performed using the K-means algorithm. Unlike traditional K-means algorithms where each point is a vector of independent features, the training points based on the data acquired from the system for predicting aggressive driving behavior 1 are based on a time series K-mean algorithm and each point is a vector of dependent features. As such, traditional Euclidean distance measures are not the best measure for quantifying the similarity between points. Therefore, the system for predicting aggressive driving behavior 1 uses DTW methods for measuring the distance between two time series trajectories.

When clustering objects are time series-based objects, a Euclidean distance measure attempts to find the similarity between two points based on the correspondence between the time indices of the two points. However, with a small shift in the time domain, a Euclidean distance matching of two time series sequences can fail to identify the similarity of two trajectories with identical patterns. Therefore, the system for predicting aggressive driving behavior 1 uses DTW as a similarity measure. DTW is a similarity measure that resolves the issues of Euclidean measurement by asynchronously mapping two time series sequences. For example, if two vehicles 71 have the exact same multi-dimensional trajectory, but one of the vehicles 71 takes action at the intersection 200 a few tenths of a second later than the other vehicle 71, the Euclidean distance between the two trajectories of the vehicles 71 could be as high as that computed for two completely different trajectories. However, by using DTW to measure between the trajectories, DTW can capture the temporal distortions in time series sequences by finding the optimal alignment path between sequence points. Additional advantages of using DTW as a similarity measure includes an ability to compute similarities between two trajectories of different lengths and a greater resilience to missing data points in the trajectories.

Given two times series sequences S and M, where S=($s_1$, $s_2$, $s_3$, ..., $s_n$) and M=($m_1$, $m_2$, $m_3$, ..., $m_n$), for each point $s_i$ in S, DTW computes the Euclidean distance between point $s_i$ and the corresponding point $m_i$ in M, and stores the minimum distance, denoted as $w_i$. DTW is then repeated for all points in S to calculate a warping trajectory W, where W=($w_1$, $w_2$, $w_3$, ..., $w_n$). The warping trajectory W is the optimal alignment path between the points in the time series sequences S and M. A similarity measure $d_{dtw}$ can then be computed as the sum of the values in the warping trajectory vector W, as given by Equation 7.

$$d_{dtw} = \Sigma_{i=1}^n w_i \quad \text{Equation 7}$$

Since the DTW algorithm provides the optimal trajectory and follows Lloyd's algorithm, the sum of intra-cluster variances will decrease with iterations of the K-means algorithm. As such, the DTW-based K-means algorithm used by the system for predicting aggressive driving behavior 1 will converge in a finite number of steps.

By using a multi-dimensional feature vector and a DTW-based K-means algorithm, the system for predicting aggressive driving behavior 1 can obtain clusters that represent different driving patterns. Each class of driving pattern may include aggressive trajectories, but the aggressive trajectories are considered as anomalous points, because the majority of the population of drivers does not engage in aggressive driving behavior. Given such a large pool of trajectories, the system for predicting aggressive driving behavior 1 uses an isolation forest anomaly detection method to identify aggressive trajectories. An isolation forest is an unsupervised learning method based on decision trees. The isolation forest is an efficient way of detecting outliers in multi-dimensional feature spaces. Unlike other outlier detection methods, such as elliptic envelopes and one-class support-vector machines (SVMs) that profile normal data points, the isolation forest method is better at identifying anomalies by using the "few" and "different" quantitative properties of anomalies to isolate the anomalies from normal data points. The anomaly score for the isolation forest, denoted as s(x, φ), is computed using Equation 8, where x is a data point, φ is the sub-sample size, h(x) is the depth of the tree, and c(φ) is the average of h(x) given φ. The anomaly score penalizes the higher number of partitions for the normal class.

$$s(x, \varphi) = 2^{-\frac{E(h(x))}{c(\varphi)}} \quad \text{Equation 8}$$

The isolation forest is trained using historical trajectory data from the intersection 200 of interest (i.e., the subject intersection 200). The isolation forest finds outlier trajectories, which are assumed to be aggressive driving trajectories, given the selected feature space. The isolation forest can be used as a basis for generating aggressiveness scores for clusters of driving patterns.

Survey-based studies may devise aggressiveness scales based on the frequency of survey participants reporting aggressive driving behaviors. In a like manner, the system for predicting aggressive driving behavior 1 similarly uses a frequency-based method to assign aggressiveness scores to clusters corresponding to driving patterns.

Using the DTW-based time series K-means algorithm, the system for predicting aggressive driving behavior 1 clusters trajectories into different classes based on an aggressiveness-based feature space. To quantify the aggressiveness level in each cluster, the system for predicting aggressive driving behavior 1 uses a trained isolation forest to identify the aggressive trajectories in each cluster. By computing the percentage of aggressive trajectories in each cluster, the system for predicting aggressive driving behavior 1 can construct a quantitative measure of aggressiveness $\theta_i$ for each driving pattern using Equation 9, where $T_i'$ is the number of trajectories identified as being aggressive by the isolation forest in cluster i, and $T_i$ is the total number of trajectories in cluster i.

$$\theta_i = \frac{T_i'}{T_i}$$

The system for predicting aggressive driving behavior 1 can identify aggressive vehicles/drivers before the vehicles 71 reach the stop line 206 at intersection 200, so as to leave enough time for the system for predicting aggressive driving behavior 1 to output warnings and/or mitigation measures to ITSs and other traffic infrastructure and/or output warnings to vehicles 71 equipped with DSRC systems. In this manner, surrounding vehicles 71, cyclists 91, and pedestrians 93 have time to be warned and take appropriate actions for avoiding aggressive drivers, and traffic infrastructure may be controlled to mitigate aggressive driving. As a vehicle 71 approaches the intersection 200, more and more of the vehicle trajectory is computed by the system for predicting aggressive driving behavior 1. For example, as a vehicle 71 approaches the intersection 200, the RSU 20 successively computes and updates the trajectory of the vehicle based on spatial-temporal data of the vehicle acquired by the sensor array 50. The system for predicting aggressive driving behavior 1 may use an online assessment to predict aggressive driving behavior of the vehicles 71.

Figure 3:
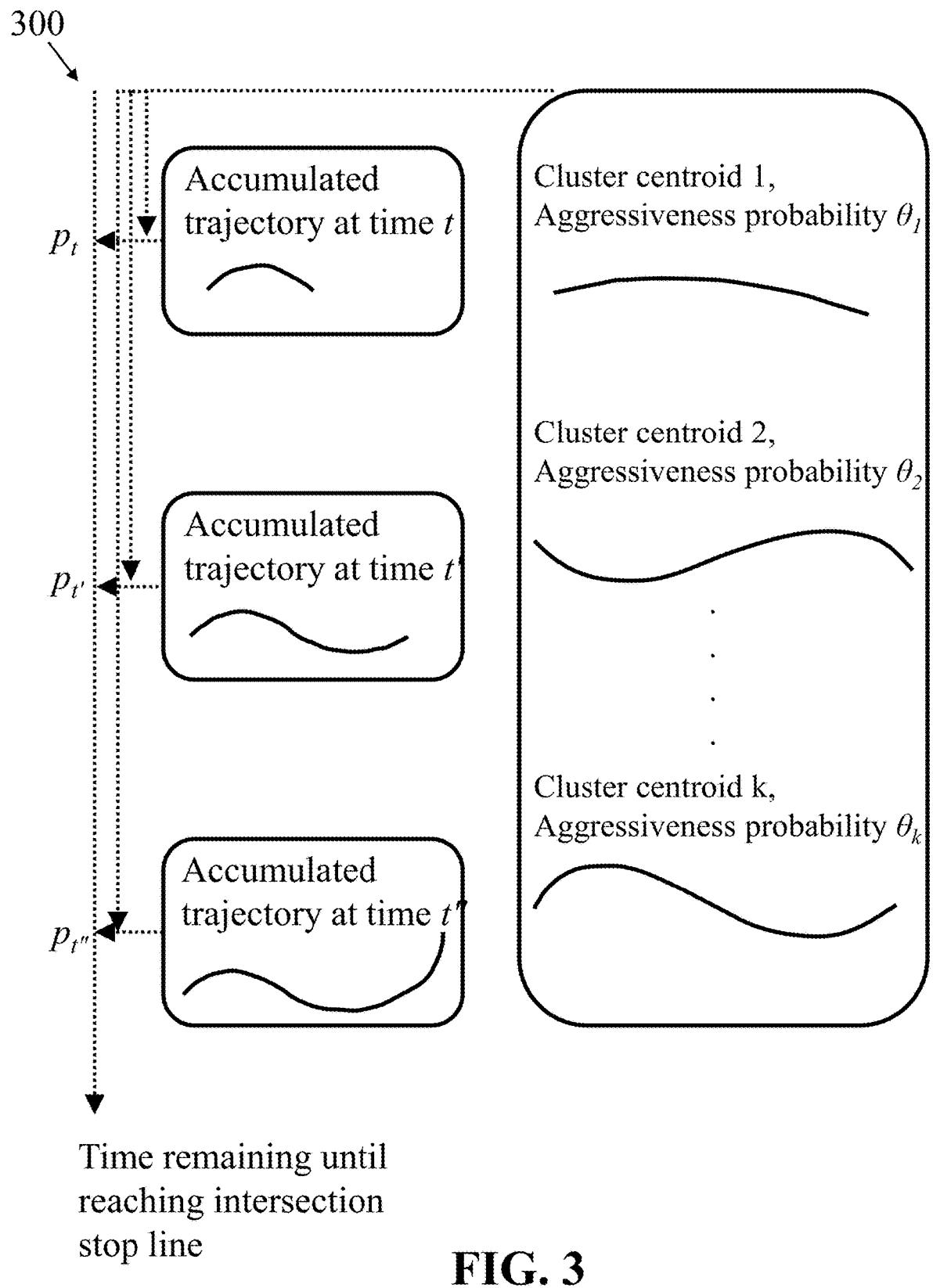
FIG. 3 is an example online assessment for the system for predicting aggressive driving behavior.

With reference to FIG. 3, an example online assessment 300 is illustrated. The online assessment 300 involves computing the DTW similarity measure between the realized portion of the trajectory and the cluster centers to find the cluster best representing the trajectory of the vehicle 71, and then assigning an aggressiveness score $\theta$ to the trajectory of the vehicle 71. In the example online assessment 300 shown in FIG. 3, vehicle trajectories are shown at times t, t', and t", where time t represents a time where trajectory data is first gathered for computing the trajectory of the vehicle 71 as the vehicle approaches the intersection 200 and the time t" represents a time where the vehicle 71 is closer to the stop line 206 at the intersection 200 than at time t. As the vehicle 71 drives closer to the intersection 200, more and more trajectory data for the vehicle 71 becomes available, for example, as shown at time t". As the vehicle trajectories are updated, the cluster membership of the trajectory may be updated to better match the updated trajectory. Both the trajectory realized at a given time and aggressiveness score $\theta$ are used to calculate the aggressiveness probability p of the approaching vehicle's trajectory at the given time. That is, as the vehicle trajectory is updated, the cluster centroid may be updated so as to update the aggressiveness score $\theta$.

The trajectory and aggressiveness score $\theta$ are used to calculate the aggressiveness probability p of the approaching vehicle's trajectory, which the system for predicting aggressive driving behavior 1 uses as a basis to better predict the aggressive driving behavior of the vehicles 71.

Figure 4:
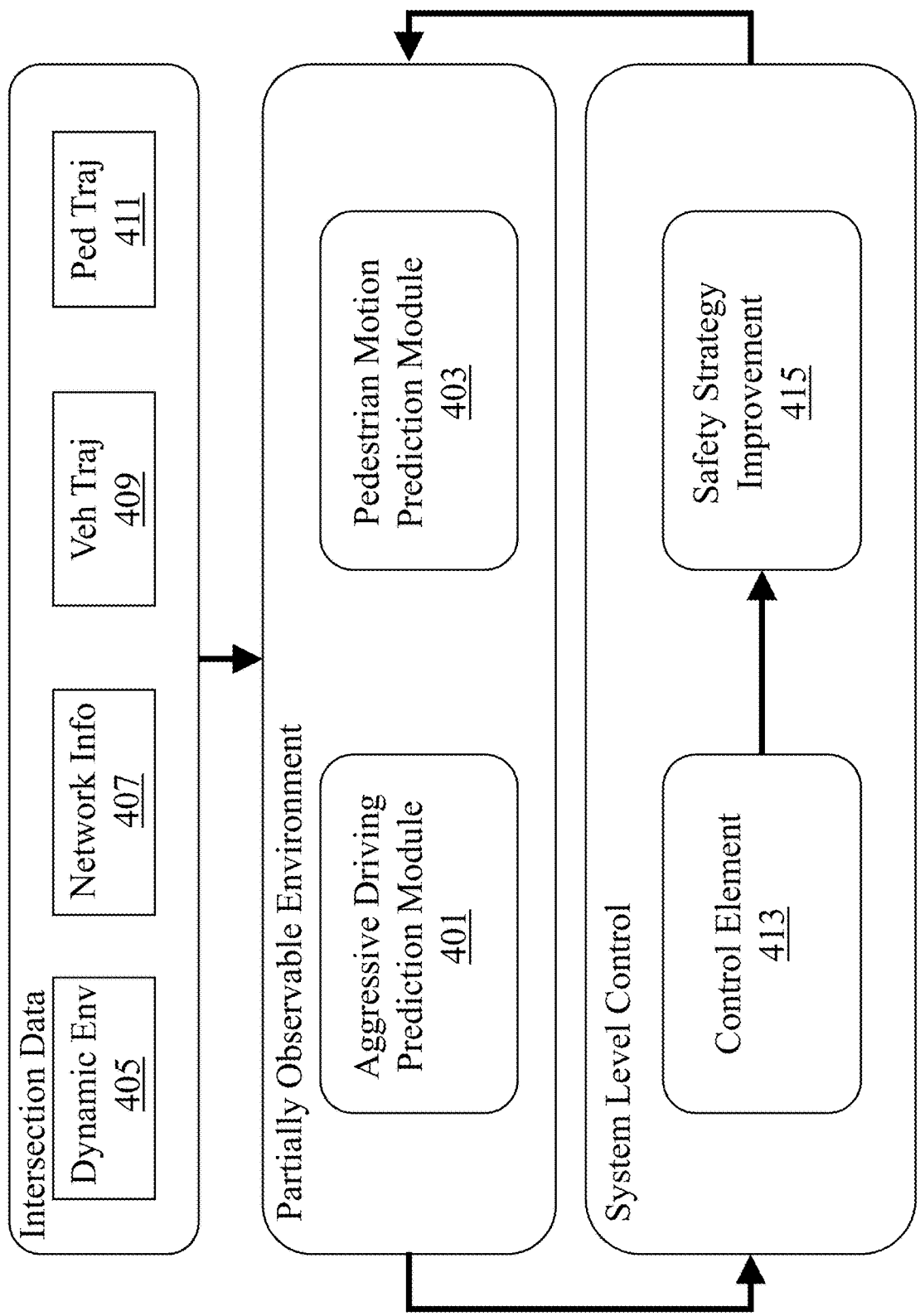
FIG. 4 is an example control framework of the system for predicting aggressive driving behavior.

With reference now to FIG. 4, a control framework 400 for the system for predicting aggressive driving behavior 1 is shown. The control framework 400 may be an intersection safety assist (ISA) algorithm that uses measurements from the sensor array 50 at intersection 200 as inputs to monitor the intersection 200 with the objective of identifying high-risk scenarios (e.g., aggressive driving) and mitigating such scenarios. The control framework 400 includes two modeling modules, that is, an aggressive driver prediction (ADP) modeling module 401 and a pedestrian motion prediction (PMP) modeling module 403. The control framework 400 may be executed by, for example, the first edge computing device 10 and/or the second edge computing device 60. More specifically, the processors 22 and 24 of the first edge computing device 10 and the second edge computing device 60 may be used to execute the control framework 400.

The PMP modeling module 403 leverages measurements from infrastructure-based sensors (e.g., the sensor array 50) to learn models that can predict and describe the trajectories of pedestrians 93 (i.e., pedestrian trajectories 411) over the next few seconds based on the most recent past trajectories of the pedestrians 93 and environmental conditions. PMP can be modeled, for example, by the first edge computing device 10 using attention models.

The ADP modeling module 401 and the PMP modeling module 403 of the control framework 400 can be used both as offline modules and an online modules. That is, the control framework 400 initially uses the ADP modeling module 401 and the PMP modeling module 403 as offline modules where ADP and PMP models/algorithms are initially constructed and frequently updated on the distributed cloud networking system 40. After initial construction and updates on the distributed cloud networking system 40, the ADP modeling module 401 and the PMP modeling module 403 can be online modules where the trained models for the ADP modeling module 401 and the PMP modeling module 403 can be implemented, for example, on the RSU 20 and/or the OBU 70, in real time, to evaluate the aggressiveness levels of drivers of the vehicles 71 and predict the motion of the pedestrians 93.

The modeling module 401 uses the dynamic environment data 405, network information 407, and the trajectory of the subject vehicle 409 as inputs. The environment data 405 may be measured by the sensor array 50 and other infrastructure based sensors to determine traffic stream conditions around the subject vehicle. The traffic stream conditions may include a number of metrics that can capture the essence of the dynamic traffic environment surrounding the subject vehicle. The network information 407 includes such information as the SPaT messaging from the traffic and pedestrian control signals 202 and 204, the number of lanes in each road approaching the intersection 200, and identifies locations where other vehicles 71 may join the traffic stream to disrupt the traffic stream. For example, the network information 407 may identify nearby parking structures and parking lots as locations where the other vehicles 71 exiting the parking structures/lots may enter and disrupt the traffic stream. The vehicle trajectory data 409 may be determined, for example, based on the proxy BSM, as determined by the RSU 20, based on the spatial-temporal data of the vehicle 71 acquired by the sensor array 50.

Once models for the ADP modeling module 401 are trained in an offline phase, they can be better used by the control framework 400, for example, as executed by the RSU 20 and/or the OBU 70, to efficiently identify aggressive driving in real time, because the control framework 400 uses vehicle trajectories sensed in real time. The real time operation of the control framework 400 may be optimized by replacing the real trajectories of the vehicles 71 with high quality trajectory predictions of the vehicles 71. The actual trajectory of a vehicle 71 may be calculated with data acquired by the sensor array 50 or by in-vehicle sensors. The trajectory predictions for the vehicle include trajectory predictions for the next few seconds of vehicle travel. For example, the trajectory predictions may include a prediction of vehicle travel for the next three to ten seconds. Once a batch of real-time trajectories are calculated and saved, for example, by the RSU 20 or OBU 70, the real-time trajectories can be further processed with the distributed cloud networking system 40 to retrain the ADP models used by the ADP modeling module 401.

Figure 5:
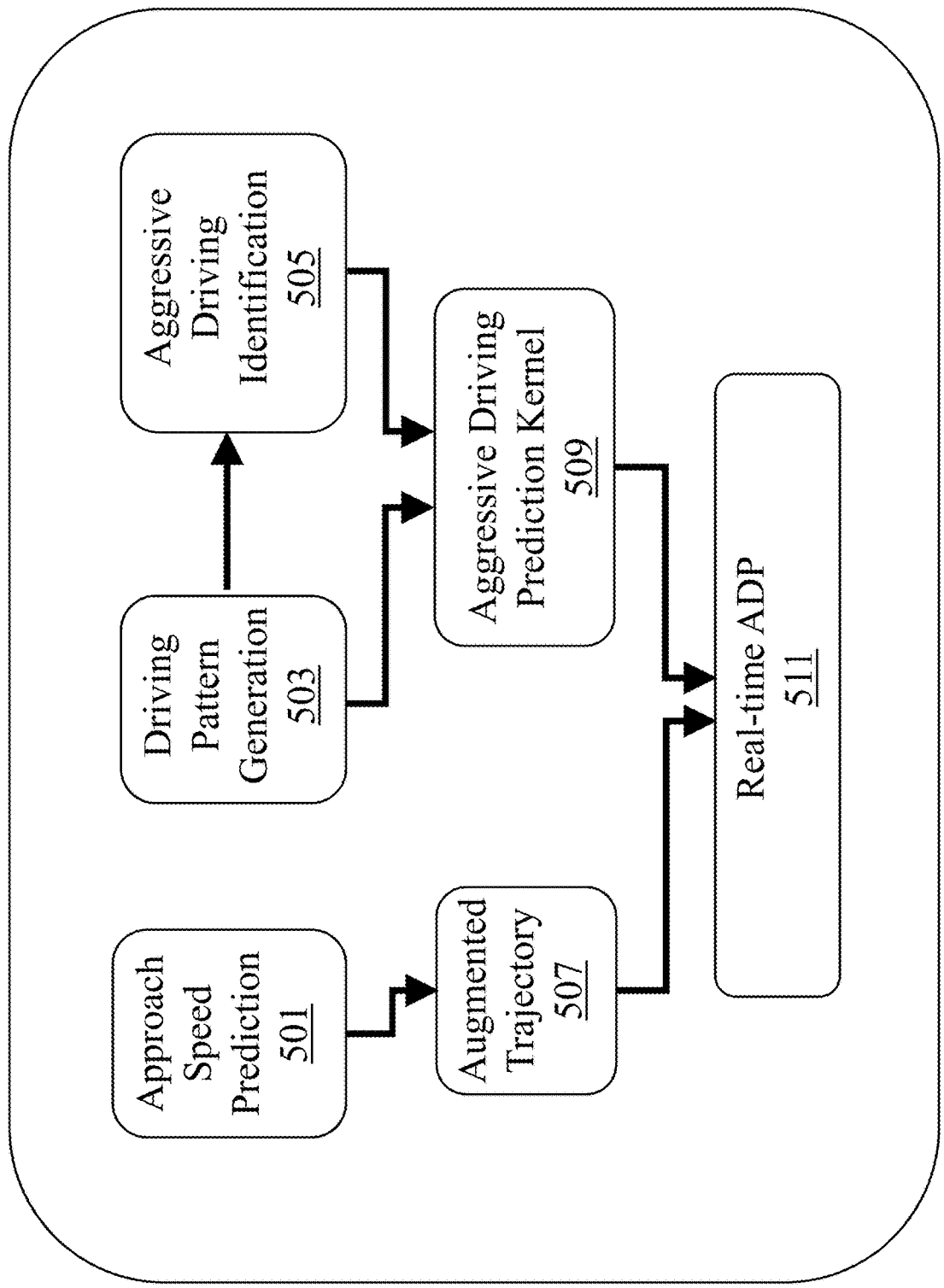
FIG. 5 is an example aggressive driving prediction modeling module of the system for predicting aggressive driving behavior.

With reference now to FIG. 5, a control framework of the ADP modeling module 401 is shown. The control framework of the ADP modeling module 401 may include approach speed prediction model 501 (e.g., a speed prediction algorithm), driving pattern generation model 503, and aggressive driving identification model 505 as first level processes executed by, for example, the first edge computing device 10 and/or the second edge computing device 60.

The approach speed prediction model 501 may be used as a basis for determining the augmented trajectory of the vehicles 71, as determined by the augmented trajectory model 507. That is, approach speed predictions of the vehicles 71 may be used as the basis for predicting the trajectories of the vehicles 71.

As described above, as the real-time trajectory data for the vehicles 71 continues to be updated from the acquired spatial-temporal data of the vehicles 71 as the vehicles approach the intersection 200, the real-time spatial temporal data may be used as a basis for approach speed predictions of the vehicles 71. The approach speed predictions may then be used at the augmented trajectory level model 507 as a basis for predicting and continuously augmenting a predicted vehicle trajectory as a vehicle 71 approaches the intersection 200.

Driving patterns from the driving pattern generation model 503 may be used both as the basis for identifying aggressive driving in the aggressive driving identification model 505 and as an input for an aggressive driving prediction kernel 509.

Aggressive driving identification, as identified by the aggressive driving identification model 505, may also be used as an input for the aggressive driving prediction kernel 509.

The aggressive driving prediction kernel 509 may be routine executed by a processor, for example, the GPU 22 and the CPU 24 in the RSU 20 and the OBU 70, to predict aggressive driving on the basis of driving patterns and aggressive driving identification.

Outputs from the augmented trajectory level model 507 and the aggressive driving prediction kernel 509 may both be used as a basis for real-time aggressive driving prediction, as determined by the real-time ADP model 511.

Figure 6:
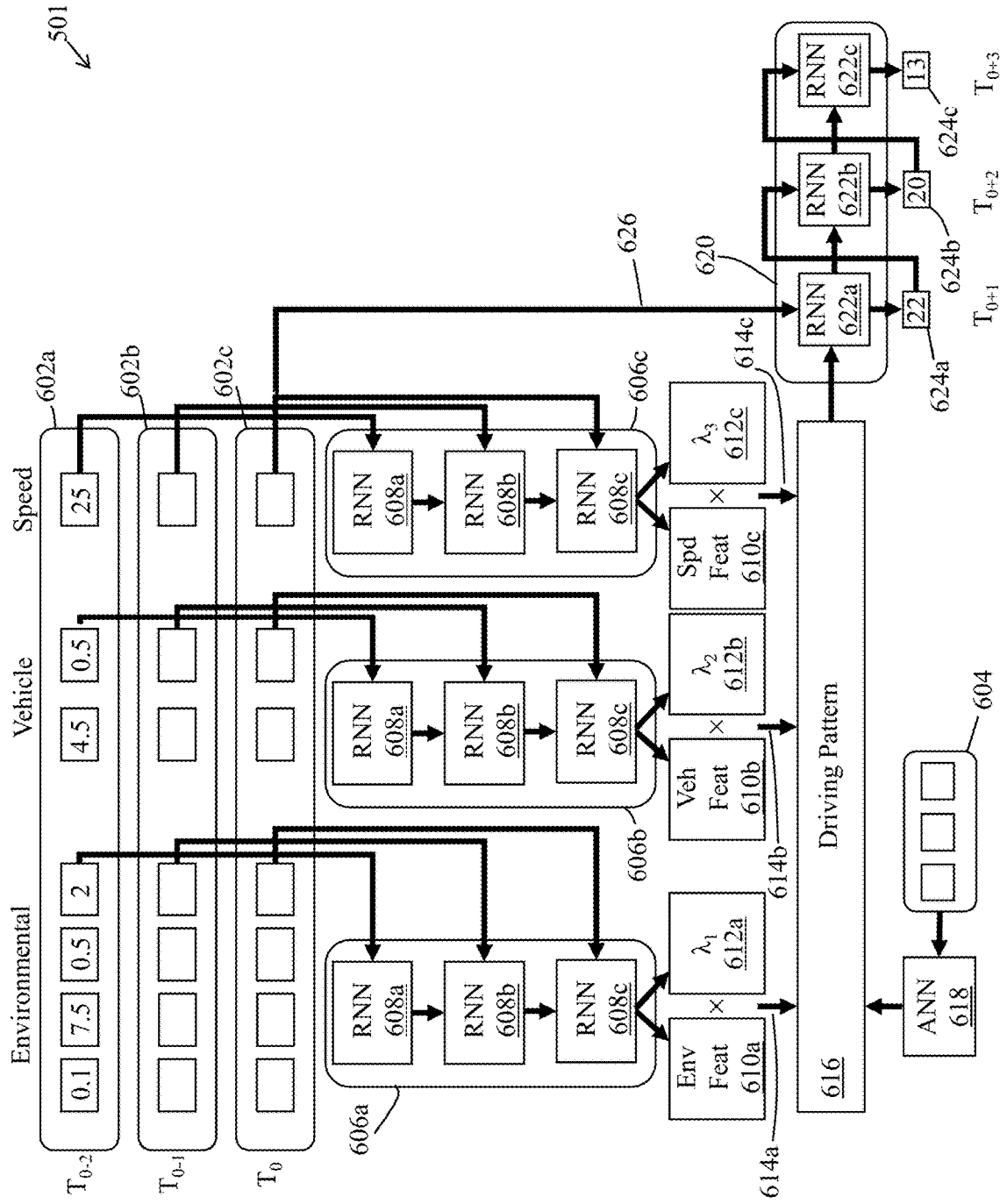
FIG. 6 is an example speed prediction model of the system for predicting aggressive driving behavior.

With reference now to FIG. 6, a schematic diagram of the approach speed prediction model 501 is shown. The approach speed prediction model 501 may be referred to more simply as a "speed prediction model" 501. Accurate, long time horizon on-road vehicle speed prediction is important for many ITS and V2X applications, for example, the system for predicting aggressive driving behavior 1. However, vehicle speed prediction may be challenging, because a speed of a subject vehicle 71 may be affected by many factors, such as traffic conditions, weather, vehicle type, driver behavior, and vehicle speed, in both deterministic and stochastic ways.

The speed prediction model 501 may be a sequence to sequence (seq2seq) model configured to map a fixed-length input with a fixed-length output, where the length of the input and output may differ. While seq2seq models may be used in applications such as language translation, voice-enabled devices, and online bots, the seq2seq model of the speed prediction model 501 may be different than conventional seq2seq models.

The speed prediction model 501 includes: inputs 602a, 602b, and 602c as short-term series data; input 604 as long-term time-series data; first, second, and third encoders 606a, 606b, 606c, an intermediate vector 616, and a decoder 620.

First, with respect to the input data, the speed prediction model 501 uses two different types of input data compared to the one type of input data used by conventional seq2seq models. That is, short-term time-series data 602a, 602b, and 602c, and long-term time-series data 604.

The input sequences in the speed prediction model 501 may be multivariate short-term time-series data that may change periodically within a short period of time. In other words, the short-term time series data may change at every time stamp or time interval. As described above, the data acquisition frequency of the sensor array 50 may be ten hertz (10 Hz). At this example frequency, the short-term time series input data is updated every tenth of a second (0.1 seconds). In FIG. 6, the time of data acquisition for the short-term time-series data 602a is given as $T_{0-2}$, the time of the data acquisition for the short-term time-series data 602b is given as $T_{0-1}$, and the time of the data acquisition for the short-term time-series data 602c is given as $T_0$. Accordingly, the time between the input data 602a acquired at $T_{0-2}$ and the input data 602b acquired at $T_{0-1}$ is a tenth of a second (0.1 seconds). The time $T_0$ represents the present, that is, the time the most recent data for the vehicle 71 is acquired. Times $T_{0+n}$, where n is a positive integer, represents a time in the future that occurs after the time $T_0$.

The multivariate short-term time-series data used as inputs by the speed prediction model 501 may be distinguished as environmental data and vehicle data. As described above, the system for predicting aggressive driving behavior 1 may use a variety of different acquisition devices and sources to acquire the input data. For example, input data may be acquired by a vehicle CAN bus, an on-board GPS, a proxy BSM, SPaT message data, and from other data.

The vehicle CAN bus 87 is a serial bus protocol used to connect individual systems (e.g., the navigation ECU 81) and sensors (e.g., the throttle sensor 83, the speed sensor 84, the brake sensor 85, and the steering wheel angle sensor 86). The vehicle CAN bus 87 allows such systems and sensors to communicate on a single or dual-wire networked data communication bus. The CAN bus protocol is a message-based protocol that enables the bus 87 to retrieve vehicle information (i.e., CAN data). Vehicle data acquired by the bus 87 using the CAN bus protocol includes acceleration/accelerator position, as measured by the throttle sensor 83, vehicle speed, as measured by the speed sensor 84, brake pressure, as measured by the brake sensor 85, and the steering wheel angle, as measured by the steering wheel angle sensor 86.

The on-board GPS can provide a global position of the vehicle 71. The global position of the vehicle 71 may be expressed in terms of latitude and longitude measurements. By matching the global positions of the vehicles to a time stamp (e.g., $T_{0-2}$, $T_{0-1}$, and $T_0$) or series of time stamps (i.e., a time series), the vehicle speed and acceleration may be calculated.

The proxy BSM, as described above, may be calculated on the basis of data acquired from the sensor array 50 including the camera 52 and the detection and ranging sensor 54, such as a radar or lidar sensor. That is, the proxy BSM is generated on the basis of measurements from the camera 50, the radar sensor 54, and the lidar sensor 54, either individually, or in combination with each other. The sensor array 50 installed at intersection 200 can detect the positions of the vehicles 71 within the detection range of the sensor array 50. The detected positions can then be mapped to global positions (e.g., as latitude and longitude values). The speed of a vehicle 71 can be measured by the detection and ranging sensor 54 (e.g., radar and/or lidar). In absence of data from the detection and ranging sensor 54, vehicle speed, as described above, can be calculated by time-series global positions of the vehicle 71.

While the proxy BSM can be used as a source for determining vehicle data such as speed and acceleration, the proxy BSM can also be used to provide the traffic environment data. For example, the proxy BSM determined on the basis of measurements from the sensor array 50 may include, but is not limited to: the distance from a subject vehicle 71 to a lead or front vehicle in front of the subject vehicle at the intersection 200 (i.e., a distance from the subject vehicle to a first lead vehicle); a distance between the first lead vehicle and another vehicle (e.g., second lead vehicle) in front of the first lead vehicle at the intersection 200; an amount of vehicles between the subject vehicle 71 and the stop line 206 at the intersection 200; the first lead vehicle's speed; the first lead vehicle's acceleration; the second lead vehicle's speed; the second lead vehicle's acceleration; and the distance from the subject vehicle 71 to the stop line 206.

The SPaT message data, as described above, may be acquired from other traffic infrastructure systems and provide an indication of the current phase/state of the traffic control signals 202 and pedestrian control signals 204. For example, the SPaT message data may include an indication of the state for a traffic control signal 202 (e.g., red, yellow, green, arrow, flashing) at a time stamp, an indication of the state of a pedestrian control signal 204 (e.g, walk, don't walk, flashing) at a time stamp, the state of all lanes at the intersection (e.g., traffic control signal for thru-traffic green, left turn signal flashing yellow) at a time stamp, as well as any active pre-emption or priority (e.g., a change of signals 202 and 204 based on a control signal from an emergency vehicle) at a time stamp. The SPaT message data is traffic environment data.

The long-term time-series data 604 changes over a relatively long period of time. For example, a long time period may be one hour. Compared to the short-term time-series data 602a, 602b, and 602c, the long-term time-series data 604 may be regarded as a constant value over short-term time periods. For example, the long-term time-series data 604 occurring over a short-term time period of ten seconds (10 seconds) may appear as constant value(s) with little to no change in the value(s) over the ten second period. Like the short-term time-series data described above, the long-term time series data may be acquired by the same acquisition devices and sources. The long-term time-series data 604 may also be acquired from other data and sources. Examples of long-term time-series data include, but are not limited to: weather, such as rain level, snow level, and fog level; time of day; and air quality index. For example, for long-term time-series weather data, such data may be obtained periodically, for example, from a National Weather Service (NWS) Office or from the National Oceanic and Atmospheric Administration (NOAA) Weather Radio (NWR) broadcast.

Another difference between the seq2seq model used by the speed prediction model 501 and conventional seq2seq models may be the number of encoders used by the speed prediction model 501. The example speed prediction model 501 in FIG. 6 may use three encoders, that is, a first encoder 606a, a second encoder 606b, and a third encoder 606c arranged in parallel. A conventional seq2seq model may use only one encoder. The encoders 606a, 606b, and 606c may be realized as virtual elements, for example, as an algorithm or model executed as part of a program or instruction set (i.e., software), or may be realized by hardware elements, for example, as one or more ICs, processors, or other circuit(s). The speed prediction model 501 is not limited to three encoders but may use one or more encoders. The speed prediction model 501 may select a number of encoders based on available data. For example, if a vehicle is only able to acquire data from a GPS and environmental data is not available, the speed prediction model 501 may reduce the number of encoders.

In the example speed prediction model 501 shown in FIG. 6, the first encoder 606a may be used to extract features from the traffic environment data. The second encoder 606b may be used to extract features of the vehicle data acquired by vehicle sensors, where such features may not include vehicle speed data. The third encoder 606c may be used to extract features from the vehicle speed data.

Each of the encoders 606a, 606b, and 606c in the example speed prediction model 501 shown in FIG. 6 is configured similarly. That is, each of the first encoder 606a, the second encoder 606b, and the third encoder 606c is composed of a stack of several recurrent units 608a, 608b, and 608c. The recurrent units 608a, 608b, and 608c may be all of the same type. For example, as shown in FIG. 6, the recurrent units 608a, 608b, and 608c are illustrated as recurrent neural networks (RNNs). However, other example configurations of the speed prediction model 501 may include a combination of different types of recurrent units. Other example recurrent units include long short-term memory networks (LSTMs) and gated recurrent units (GRUs).

The recurrent units 608a, 608b, and 608c each accept multivariate data of a short-term time-series sequence, collects information for a time stamp, and propagates the information forward. In the speed prediction model 501 shown in FIG. 6, each of the recurrent units 608a, 608b, and 608c may accept multivariate data of each time stamp (e.g., $T_{0-2}$, $T_{0-1}$, $T_0$) and a hidden state parameter $h_i$ from a previous recurrent unit as an input. The hidden state parameter $h_i$ of recurrent unit i is computed based on the previous hidden state $h_{i-1}$ and the input vector $x_i$. The output of each recurrent unit 608a, 608b, and 608c is the hidden state parameter $h_i$ and contains the information from the previous and the current time stamps. The hidden state parameters input to the first recurrent unit 608a are initialized as all zeros.

The first encoder 606a receives both traffic environment data $x_i$ from each of the time stamps $T_{0-2}$, $T_{0-1}$, $T_0$ and the hidden state parameter $h_{i-1}$ from the previous recurrent unit. For example, the recurrent unit 608b receives the traffic environment data from the time stamp $T_{0-1}$ and the hidden state parameter $h_{t-1}$ from the recurrent unit 608a. In the first encoder 606a, the hidden state calculated by the last recurrent unit 608c (i.e., the last hidden state) is the environmental feature 610a. The environmental feature 610a is a vector. From a driver's perspective, the environmental feature 610a is the driver's experience of the traffic environment from the beginning of the drive until the present.

The last state of the first encoder 606a also calculates a weight parameter 612a (i.e., $\lambda_1$). The weight parameter 612a indicates the importance of the environmental feature 610a compared to the other features 610b and 610c. For example, sometimes the driving pattern may be affected more by the traffic environment, while other times the vehicle speed may have a greater effect on the driving pattern. The calculated weight parameter 612a is based on a layer of a fully connected neural network. The parameters of such a fully connected neural network may be adjusted during the training of the neural network. The product of the environmental feature 610a and the weight parameter 612a may be referred to as the revised environmental feature 614a. The revised environmental feature 614a is an input to the intermediate vector 616.

The operation of the second encoder 606b is similar to the operation of the first encoder 606a. That is, multivariate time-series data for vehicle data excluding vehicle speed are input into the second encoder and propagated to the last hidden state 610b where the last hidden state represents the vehicle feature 610b. Like the environmental feature 610a, the vehicle feature 610b is a vector. From the driver's perspective, the vehicle feature vector 610b is a comprehensive representation of the vehicle state of the vehicle 71. A weighted parameter 612b (i.e., $\lambda_2$) is calculated by a fully connected neural network based on the last hidden state 610b. The weighted parameter 612b represents the importance of the vehicle feature. The product of the vehicle feature 610b and the weighted parameter 612b is the revised vehicle feature 614b. The revised vehicle feature 614b is an input to the intermediate vector 616.

The operation of the third encoder 606c is similar to the operation of the first encoder 606a and the second encoder 606b. The input to the third encoder 606c is the vehicle speed. As described above, the vehicle speed may be obtained by the CAN bus 87 of the vehicle 71, the BSM of a DSRC-enabled vehicle 71, or by the proxy BSM, as calculated by the RSU 20, or by GPS data. Univariate time-series data is input to the third encoder 606c and propagated to the last hidden state 610c that represents the speed feature. A weighted parameter 612c (i.e., $\lambda_3$) is calculated by a fully connected neural network based on the last hidden state 610c. The weighted parameter 612c represents the importance of the speed feature. The product of the speed feature 610c and the weighted parameter 612c is the revised speed feature 614c. The revised speed feature 614 is an input to the intermediate vector 616.

Another difference between the seq2seq model used by the speed prediction model 501 and conventional seq2seq models may be an amount of different data types (e.g., 614a, 614b, and 614c) used as inputs to the intermediate vector 616. While a conventional seq2seq model may be limited to one type of data being input to the intermediate vector, the speed prediction model 501 may input more than one data type into an intermediate vector 616.

The intermediate vector 616 encapsulates the information for all the input elements so that the decoder 620 can make accurate predictions. The intermediate vector 616 may be considered as the initial hidden state of the decoder 620. In making vehicle speed predictions, the intermediate vector 616 is a concatenation of two inputs, that is, (i) the revised features 614a, 614b, and 614c based on the short-term time-series data 602a, 602b, and 602c, and (ii) the long-term time-series data 604. As described above, the short-term time-series inputs include the revised environmental feature 614a from the first encoder 606a, the revised vehicle feature 614b from the second encoder 606b, and the revised speed feature 614c from the third encoder 606c. As described above, the long-term time-series data 604 may include such data as the time of day (e.g., rush hour), weather (e.g., sunny, rain, snow), and visibility level (e.g., air quality, smog, fog). The long-term time-series data 604 goes through a fully connected layer of an artificial neural network 618 (i.e., a single layer neural network). The long-term time-series data 604 is then concatenated with the revised environmental feature 614a, the revised vehicle feature 614b, and the revised speed feature 614c.

Another difference between the seq2seq model used by the speed prediction model 501 and conventional seq2seq models may be the input to the decoder 620. In natural language processing tasks such as machine translation performed by conventional seq2seq models, the inputs to a decoder are an intermediate vector and a start of sentence (SOS) symbol that is a fixed number/vector. In the speed prediction model 501, the predicted speed is presumed as a continuous value. As such, the inputs to the decoder 620 include the intermediate vector 616 and a last speed value 626 at time $T_0$ before the speed prediction.

The example decoder 620 shown in FIG. 6 is a stack of three recurrent units 622a, 622b, and 622c. Each of the recurrent units 622a, 622b, and 622c may predict vehicle speed $v_t$ as an output (e.g., 624a, 624b, and 624c) at a future time step T. For example, as shown in FIG. 6, the first recurrent unit 622a predicts a vehicle speed 624a at time $T_{0+1}$, the second recurrent unit 622b predicts a vehicle speed 624b at time $T_{0+2}$, and the third recurrent unit 622c predicts a vehicle speed 624c at time $T_{0+3}$. The input to each recurrent unit 622a, 622b, and 622c may include the hidden state of the previous recurrent unit and the predicted output of the previous recurrent unit. The respective outputs 624a, 624b, and 624c of each of the recurrent units 622a, 622b, and 622c includes the hidden state of the respective recurrent unit and the predicted vehicle speed of the future time stamp corresponding to the recurrent unit. For example, the outputs of the first recurrent unit 622a include the hidden state of the first recurrent unit 622a and the predicted speed 624a at time $T_{0+1}$. The hidden state from the first recurrent unit 622a and the predicted speed output 624a of the first recurrent unit 622a are then used as inputs into the second recurrent unit 622b of the decoder 620. The first recurrent unit 622a uses both the intermediate vector 616a and the vehicle speed 626 at time $T_0$ as inputs. The first recurrent unit 622a uses the vehicle speed 626 so that the predicted speeds 624a, 624b, and 624c appear as continuous values. The output sequence of the decoder 620 (i.e., 624a, 624b, and 624c) is a collection of predicted speeds (i.e., speed points of prediction).

Like the recurrent units 608a, 608b, and 608c in the encoders 606a, 606b, and 606c, the recurrent units 622a, 622b, and 622c in the decoder 620 may be any combination of RNNs, LSTMs, and GRUs.

The speed prediction model 501 may be used outside of the system for predicting aggressive driving behavior 1. However, like the system for predicting aggressive driving behavior 1, the speed prediction model 501 may be used as part of traffic safety applications, systems, and infrastructure. For example, the speed prediction model 501 may be used to predict stop sign and red light violations at intersections (e.g., the intersection 200). By using the speed prediction model 501, behavior such as running stops signs and red lights may be predicted within a time horizon and such predictions may be used as the basis for providing a warning to the host/subject vehicle and surrounding vehicles and road users in order to prevent collisions.

The speed prediction model may also be used to protect VRUs. For example, the speed prediction model 501 may predict potential threats to VRUs based on the speed of the subject vehicle 71 and send warning messages to both the subject vehicle 71 and the VRUs.

The speed prediction model 501 may also be used for power management application in vehicles 71. In plug-in hybrid electric vehicles (PHEVs), the speed prediction model 501 may be used to improve the power management of the PHEVs. For example, by using the speed prediction model 501 to predict future vehicle speeds for PHEVs, the PHEVs can better budget and manage on-road power.

To summarize the operation of the speed prediction model 501, the speed prediction model 501 may use such data as the vehicle data and SPaT message data as inputs, and output a three to five second speed prediction profile of the vehicle 71 using deep learning, where such speed predictions may depend on environmental conditions. The speed prediction model 501 can be used as one of the inputs in the ADP module 401 in the system for predicting aggressive driving behavior 1.

With reference again to FIG. 4, the control framework 400 with the ADP model 401 and the PMP model 403 can be used to identify risks around the intersection 200. Outputs from the ADP module 401 and PMP module 403 can be output to a control element 413. Control signals to/from the control elements 413 may be used as a basis for safety strategy improvements 415. The safety strategy improvements 415 can then be used as feedback to adjust and further train the ADP modeling module 401 and the PMP modeling module 403.

While the system for predicting aggressive driving behavior 1 has been described with reference to a single intersection 200, the system for predicting aggressive driving behavior is not limited to use at single intersection and may be configured as a corridor system, that is, over a series of intersections along a corridor.

Figure 7:
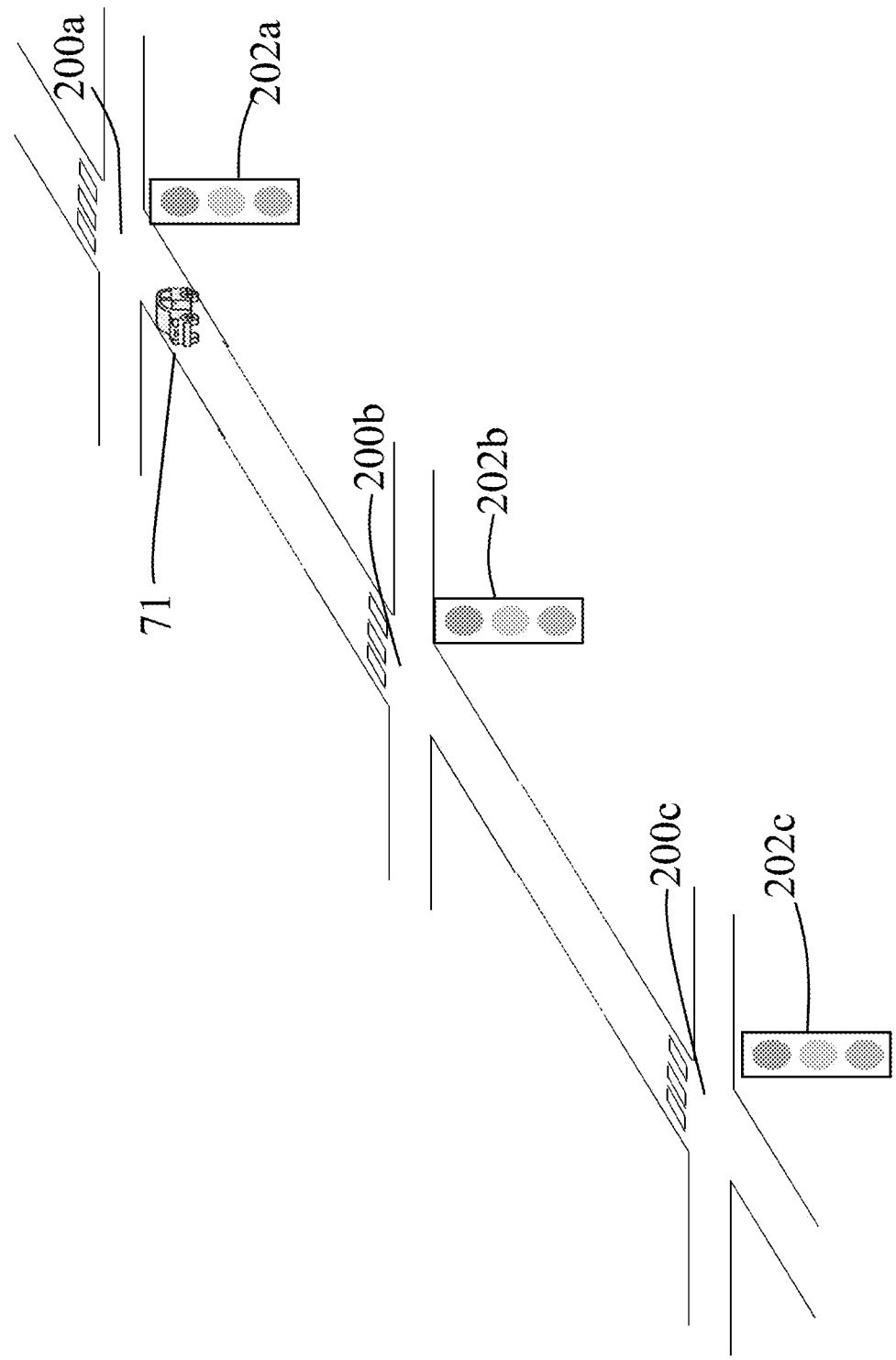
FIG. 7 is another example use environment of the system for predicting aggressive driving behavior.

With reference to FIG. 7, an example corridor including intersections 200a, 200b, and 200c is illustrated. Once a driving pattern for the vehicle 71 is identified at the intersection 200a, the knowledge of such driving pattern may be adapted and applied node to node. That is, once the driving pattern of the vehicle 71 is identified at the intersection 200a, the system for predicting aggressive driving behavior 1 can apply the known driving pattern to subsequent nodes (i.e., intersections) 200b and 200c along a corridor. To realize these benefits, the control framework 400 may be applied to multiple intersections 200a, 200b, and 200c. Because a large number of vehicles may pass through each of the intersections 200a, 200b, and 200c along the corridor, the system for predicting aggressive driving behavior 1 can analyze the trajectory of vehicles through multiple intersections. In such manner, the different intersections 200a, 200b, and 200c can be compared in terms of risk levels. If the driver of the vehicle 71 consistently scores higher on aggressiveness levels at certain intersections, follow-up studies can be performed to identify the factors that cause the unsafe conditions. For example, the design of the intersection (e.g., geometry of the intersection) may contribute to an intersection causing higher aggressive driving scores.

Additionally, if the driving pattern at one intersection (e.g., the intersection 200a) predicts and/or indicates aggressive driving in the vehicle 71, remedial measures such as the control of control elements may be employed at subsequent intersections (e.g., intersections 200b and 200c) to control and mitigate aggressive driving behavior. For example, if the system for predicting aggressive driving behavior 1 predicts that the vehicle 71 may run a red light at the intersection 200a, the system for predicting aggressive driving behavior 1 may output a control signal for controlling the state/phase of the traffic control signals 202b and 202c at the intersections 200b and 200c. In such manner, the traffic control signals 202b and 202c may change to red, for example, before the vehicle 71 passes through the intersection 200a to encourage the vehicle 71 to slow down and not attempt speed up in an effort to drive through intersections 200b and 200c before the signals 202b and 202c change to red. Alternatively, when the system for predicting aggressive driving behavior 1 predicts that the vehicle 71 may run a red light at the intersection 200a and at subsequent intersections 200b and 200c, the control signals 202a, 202b, and 202c for all directions of traffic may change to red in an attempt to slow down the vehicle 71 and prevent cross traffic at the intersections 200a, 200b, and 200c from moving through the intersections to avoid the possibility of collision with the vehicle 71. In other words, the system for predicting aggressive driving behavior 1, after predicting aggressive driving behavior for the vehicle 71 before the intersection 200a, may use the additional time before the vehicle 71 reaches subsequent intersections 200b and 200c to control the downstream traffic control signals 200b and 200c to make the corridor safer for other road users.

With reference again to FIG. 4, the control elements 413 may use aggressive driving predictions from the system for predicting aggressive driving 1 to mitigate aggressive driving behavior. As described above, the traffic control signals 202a, 202b, and 202c are an example of the control elements 413.

Figure 8A:
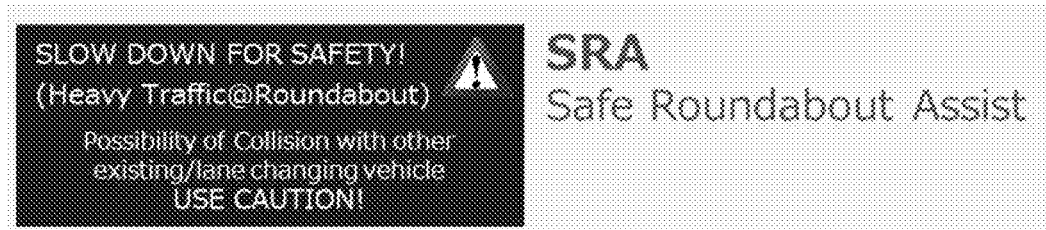
FIG. 8A is an example warning output of the system for predicting aggressive driving behavior.
Figure 8B:
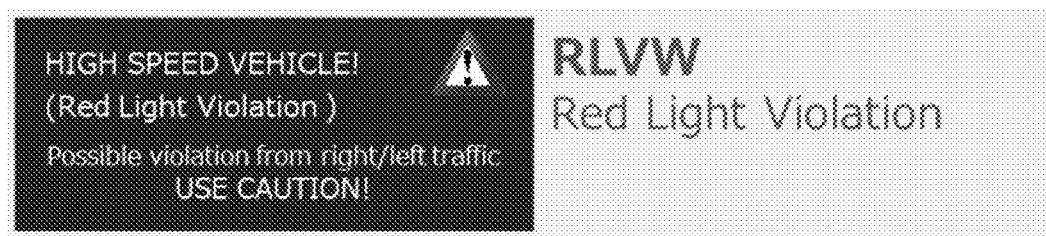
FIG. 8B is another example warning output of the system for predicting aggressive driving behavior.
Figure 8C:
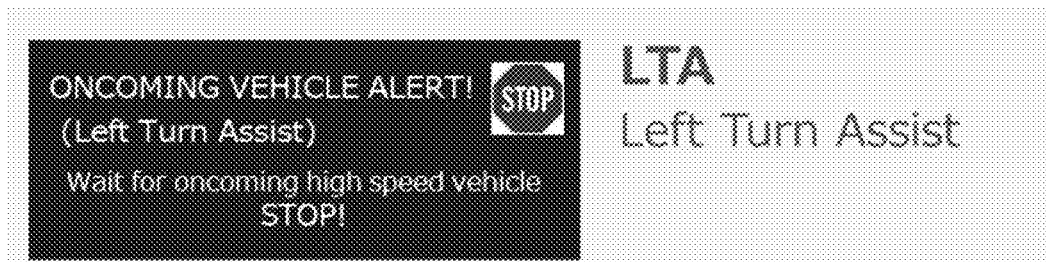
FIG. 8C is another example warning output of the system for predicting aggressive driving behavior.

In another example embodiment, a smartphone, vehicle display, or like device carried by road users 71, 91, and 93 or installed in vehicles 71 may be used as a control element 413 to warn of aggressive driving behavior as well as outputting other warnings. The smartphone, vehicle display, and like devices are not limited to outputting a visual display warning, but may also output audio warnings, or a combination of audio and visual warnings. As such, this control element may be referred to as an audio visual device 413. FIGS. 8A-8C illustrate example warnings that may be output to such audio visual devices 413.

When the system for predicting aggressive driving behavior 1 predicts aggressive driving in a subject vehicle, a warning message such as the warning in FIG. 8A may be output to the audio visual device 413 in the subject vehicle to warn an aggressive driver to slow down.

When the system for predicting aggressive driving behavior 1 predicts aggressive driving in another vehicle, warning messages such as the warnings shown in FIGS. 8B and 8C may be output to the audio visual device 413 of road users 71, 91, and 93 to warn the road users of nearby aggressive driving behavior, such as vehicles predicted to run a red light or vehicle proceeding through the intersection 200 at a high rate of speed.

Once the system for predicting aggressive driving behavior 1 applies the control element 413, the system for predicting aggressive driving behavior 1 may assess the traffic environment as safety and strategy improvement 415 to assess the effectiveness of such control elements 413 and decide on future control. The safety and strategy improvement 415 may be used as feedback to the ADP modeling module 401 and PMP modeling module 403 to update and train modules 401 and 403.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A and B should be construed to mean a logical (A OR B), using a non-exclusive logical OR. For example, the phrase at least one of A and B should be construed to include any one of: (i) A alone; (ii) B alone; (iii) both A and B together. The phrase at least one of A and B should not be construed to mean "at least one of A and at least one of B." The phrase at least one of A and B should also not be construed to mean "A alone, B alone, but not both A and B together." The term "subset" does not necessarily require a proper subset. In other words, a first subset of a first set may be coextensive with, and equal to, the first set. As used herein, the term "and/or" includes any and all combinations of one or more of the associated listed items.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgments of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A system for predicting aggressive driving behavior for a driver of a vehicle, the system comprising:
   a sensor array that is a part of a traffic infrastructure and located stationary near a road intersection, the sensor array is configured to output spatial-temporal data indicative an object and movement of the object around or about the road intersection, wherein the object includes the vehicle;
   a first edge computing device configured to acquire the spatial-temporal data for the vehicle from the sensor array, wherein the first edge computing device comprises:
      a distributed cloud networking system having one or more trained computer models, wherein the one or more trained computer models includes one or more machine learning models, and wherein the one more trained models include at least a first trained model to predict and describe a trajectory of the vehicle and a second trained module to predict and describe a trajectory of a pedestrian,
      a control element; and
      a roadside unit is in communication with the distributed cloud networking system and the control element and is integrated into the traffic infrastructure and located stationary near or about a road intersection, the roadside unit having:
         a processor; and
         a non-transitory computer-readable medium including instructions that are executable by the processor of the first edge computing device, the instructions included on the non-transitory computer-readable medium of the first edge computing device comprising:
         executing one or more unsupervised deep learning methods on the spatial-temporal data acquired by the one or more sensors to cluster the spatial-temporal data as a driving score, wherein the unsupervised deep learning methods include one or more artificial intelligence algorithms, and
         applying the one or more trained computer models from the distributed cloud network to the driving score to determine an aggressive driving behavior risk level, wherein
      the roadside unit is further configured to predict the aggressive driving behavior for one or more vehicles near or about the intersection in real time based on the aggressive driving behavior risk level based on a driving style using measures of vehicle motion, an energy consumption, and a force on the vehicle to form a predicted real-time aggressive driving behavior; and
      controlling the control element in real-time to mitigate the predicted real-time aggressive driving behavior, in response to predicting the aggressive driving behavior, wherein the control element includes at least one of controlling one or more traffic control signals to the traffic infrastructure and outputting one or more warnings to the one or more vehicles, the first edge computing device comprises:
  a speed prediction model is a machine learning model and is configured to receive short-term time-series data and long-term time-series data, wherein the short-term times-series data is a different type of data than the long-term time-series data, wherein the short-term time-series data is configured to change at least one of: every time stamp, time interval or a combination thereof, and wherein the long-term time-series data changes over a longer period of time than the short-term time-series data, and wherein the speed prediction model includes:
    a plurality of encoders includes at least a first encoder and a second encoder, wherein each of the plurality of encoders includes a plurality of recurrent units, wherein:
      a first encoder of the plurality of the encoders is configured to acquire a multivariate short-term time-series data periodically at a short-term interval, and propagating the multivariate short-term time-series data through a first plurality of recurrent units of the first encoder to output a first hidden state parameter from the first encoder, and
      a second encoder of the plurality of encoders configured to acquire a univariate short-term time-series data periodically at the short-term interval and propagate the univariate short-term time-series data through a second plurality of recurrent units of the second encoder to output a second hidden state parameter from the second encoder,
    an artificial neural network configured to acquire a multivariate long-term time-series data periodically at a long-term interval, and
    a decoder having a stack of recurrent units, wherein each of the recurrent units includes a machine learning module configured to predict vehicle speed at a future time step and each of a predicted vehicle speed is associated with a different future time.

2. The system of claim 1, wherein the first edge computing device is configured to acquire a second set of spatial-temporal data acquired by the sensor array and predict, in real time, an updated aggressive driving behavior in real time before one or more vehicles approach a stop line at the intersection, wherein the updated aggressive driving behavior is based on the second set of spatial-temporal data, an updated driving behavior risk and a previous determined driving score.

3. The system of claim 2, wherein the instructions further comprise calculating a trajectory of the vehicle from the spatial-temporal data, and wherein the driving score is a dynamic time warping-based dissimilarity score (DTW score), the DTW score based on the calculated trajectory of the one or more vehicles.

4. The system of claim 1, wherein the one or more unsupervised deep learning methods includes executing a dynamic time warping (DTW)-based time series K-means algorithm to cluster the spatial-temporal data as the driving score.

5. The system of claim 1, wherein the instructions further include applying an isolation forest to the driving score and a plurality of other driving scores to determine anomalies among the driving score and the plurality of other driving scores.

6. The system of claim 1, further comprising:
  a second edge computing device configured to acquire vehicle data from one or more sensors on the vehicle, the second edge computing device disposed in the vehicle, and the second edge computing device having a processor; and
  a non-transitory computer-readable medium including instructions that are executable by the processor of the second edge computing device, the instructions included on the non-transitory computer-readable medium of the second edge computing device comprising:
    acquiring vehicle data from the one or more sensors on the vehicle, and
    transmitting the vehicle data to the first edge computing device, wherein
  the first edge computing device is further configured to
    execute one or more unsupervised deep learning methods on the vehicle data to cluster the vehicle data as another driving score, and
    apply the one or more machine learning models to the other driving score to determine another aggressive driving behavior risk level.

7. A system for predicting aggressive driving behavior for a driver of a vehicle, the system comprising:
  a sensor array that is a part of a traffic infrastructure and located stationary near a road intersection, the sensor array is configured to output spatial-temporal data indicative an object and movement of the object around or about the traffic intersection, wherein the object includes the vehicle;
  one or more edge computing devices configured to acquire short-term time-series data from at least one of (i) the sensor array and (ii) one or more vehicle sensors in the vehicle, each of the one or more edge computing devices comprising:
    a distributed cloud networking system having one or more trained models, wherein the one or more trained models includes one or more machine learning models, and wherein the one more trained models include at least a first trained model to predict and describe a trajectory of the vehicle;
    a control element; and
    a roadside unit is in communication with the distributed cloud networking system and the control element and is integrated into the traffic infrastructure and located stationary near or about a road intersection, the roadside unit having:
      a processor, and
      a non-transitory computer-readable medium including instructions that are executable by the processor of the one or more edge computing devices, the instructions included on the non-transitory computer-readable medium comprising:
    predicting an approach speed of the vehicle to an intersection based on the short-term time-series data,
    generating a driving pattern corresponding to driving style based on the short-term time-series data wherein the driving style is based on measures of vehicle motion, an energy consumption, and a force on the vehicle,
    identifying aggressive driving behavior based on the driving patterns, predicting, using one or more artificial intelligence algorithms, a predicted trajectory of the vehicle based on the predicted approach speed of the vehicle,
predicting a real-time aggressive driving behavior based on the driving pattern, the identified aggressive driving behavior, and the predicted trajectory of the vehicle; and
wherein the instructions further comprise controlling a control element in real-time to mitigate the predicted real-time aggressive driving behavior, in response to predicting the real-time aggressive driving behavior, and wherein the control element includes at least one of controlling one or more traffic control signals to the traffic infrastructure,
each of the one or more edge computing devices comprises:
a speed prediction model is a machine learning model and is configured to receive the short-term time-series data and long-term time-series data, wherein the short-term times-series data is a different type of data than the long-term time-series data, wherein the short-term time-series data is configured to change at least one of: every time stamp, time interval or a combination thereof, and wherein the long-term time-series data changes over a longer period of time than the short-term time-series data, and wherein the speed prediction model includes:
a plurality of encoders includes at least a first encoder and a second encoder, wherein each of the plurality of encoders includes a plurality of recurrent units, wherein:
a first encoder of the plurality of the encoders is configured to acquire a multivariate short-term time-series data periodically at a short-term interval, and propagating the multivariate short-term time-series data through a first plurality of recurrent units of the first encoder to output a first hidden state parameter from the first encoder, and
a second encoder of the plurality of encoders configured to acquire a univariate short-term time-series data periodically at the short-term interval and propagate the univariate short-term time-series data through a second plurality of recurrent units of the second encoder to output a second hidden state parameter from the second encoder,
an artificial neural network configured to acquire a multivariate long-term time-series data periodically at a long-term interval, and
a decoder having a stack of recurrent units, wherein each of the recurrent units includes a machine learning module configured to predict vehicle speed at a future time step and each of a predicted vehicle speed is associated with a different future time.

8. The system of claim 7, wherein the intersection is a single intersection.

9. The system of claim 7, wherein the intersection is a plurality of intersections, the instructions being executed at each of the plurality of intersections.

10. The system of claim 7, wherein
the multivariate short-term times-series data includes at least one of environmental data and vehicle data,
the first encoder is configured to acquire the multivariate short-term time-series data that includes environmental data, and
the plurality of encoders further comprises a third encoder of the plurality of encoders and the third encoder is configured to acquire a second multivariate short-term time-series data periodically at a short-term interval, wherein the second multivariate short-term time-series that includes a vehicle speed, and wherein the third encoder is configured to propagate the second multivariate short-term time-series through a third plurality of recurrent units of the third encoder to output a third hidden state parameter from the third encoder.

11. The system of claim 7, wherein controlling the control element includes outputting one or more warnings to an audio visual device of at least one of:
a subject vehicle having the predicted real-time aggressive driving behavior,
other vehicles surrounding the subject vehicle having the predicted real-time aggressive driving behavior, and
vulnerable road users around the subject vehicle having the predicted real-time aggressive driving behavior.

12. The system of claim 7, wherein the one or more edge computing devices are further configured to acquire long-term time-series data from at least one of (i) one or more sensors that are part of traffic infrastructure and (ii) one or more vehicle sensors in the vehicle.

13. A system for predicting aggressive driving for a driver of a vehicle, the system comprising:
one or more edge computing devices configured to acquire short-term time-series data and long-term time-series data from at least one of (i) one or more sensors that are part of traffic infrastructure and (ii) one or more vehicle sensors in the vehicle, each of the one or more edge computing devices having:
a speed prediction model is configured to receive at the short-term time-series data and the long-term time-series data, wherein:
the speed prediction model is a machine learning model,
the short-term times-series data is a different type of data than the long-term time-series data, and
the short-term time-series data is configured to change at least one of: every time stamp, time interval or a combination thereof,
wherein the speed prediction model includes:
a plurality of encoders includes at least a first encoder and a second encoder, the first encoder includes a first plurality of recurrent units and the second encoder includes a second plurality of recurrent units, said first encoder different than the second encoder, and
a decoder; and
wherein a speed prediction model further includes:
a processor, and
a non-transitory computer-readable medium including instructions that are executable by the processor of the one or more edge computing devices, the instructions included on the non-transitory computer-readable medium comprising:
acquiring a multivariate short-term time-series data periodically at a short-term interval,
acquiring a univariate short-term time-series data periodically at the short-term interval,
acquiring a multivariate long-term time-series data periodically at a long-term interval,
propagating the multivariate short-term time-series data through a first plurality of recurrent units of the first encoder to output a first hidden state parameter from the first encoder,
propagating the univariate short-term time-series data through a second plurality of recurrent units of the second encoder to output a second hidden state parameter from the second encoder;

processing the multivariate long-term time-series data with a neural network, concatenating the first hidden state parameter, the hidden state parameter, and the processed multivariate long-term time-series data to generate an intermediate vector, inputting the intermediate vector to the decoder, and predicting a plurality of vehicle speeds from the decoder based on the intermediate vector.

14. The system of claim 13, wherein the short-term interval is 0.1 seconds or less and the long-term interval is 10 seconds or more.

15. The system of claim 13, wherein the first encoder and the second encoder are arranged in parallel to one another.

16. The system of claim 13, wherein the plurality of recurrent units are at least one of a recurrent neural-network, a long short-term memory, and a gated recurrent unit.

17. The system of claim 16, wherein:
wherein:
a first recurrent unit of the first plurality of recurrent units in the first encoder determines a first hidden state parameter based on the multivariate time-series data acquired at a first time stamp and an initial value, a second recurrent unit of the first plurality of recurrent units in the first encoder determines a second hidden state parameter based on the multivariate time-series data acquired at a second time stamp and the first hidden state parameter from the first recurrent unit in the first encoder, a first recurrent unit of the second plurality of recurrent units in the second encoder determines a third hidden state parameter based on the univariate time-series data acquired at the first time stamp and the initial value, a second recurrent unit of the second plurality of recurrent units in the second encoder outputs a fourth hidden state parameter based on the univariate time-series data acquired at the second time stamp and the third hidden state parameter from the first recurrent unit of the second plurality of recurrent units in the second encoder, and the second time stamp occurs after the first time stamp.

18. The system of claim 16, wherein:
the decoder includes at least a first recurrent unit and a second recurrent unit, the first recurrent unit in the decoder is configured to receive the intermediate vector and a most-recent univariate time-series data input and predict a vehicle speed, and the subsequent recurrent unit in the decoder is configured to receive an input of a hidden state and a predicted vehicle speed at a first time past a present time from the first recurrent unit in the decoder and predict a second vehicle speed at a second time past a present time, wherein the first time is before the second time.

19. The system of claim 13, wherein the plurality of predicted vehicle speeds is predicted at a future time occurring at least three seconds past a present time.

* * * * *